United States Patent
Matsuyama et al.

(10) Patent No.: US 12,473,493 B2
(45) Date of Patent: Nov. 18, 2025

(54) LIQUID CRYSTAL COMPOSITION, LIGHT ABSORPTION ANISOTROPIC LAYER, LAMINATE, AND IMAGE DISPLAY DEVICE

(71) Applicant: FUJIFILM Corporation, Tokyo (JP)

(72) Inventors: Hiroshi Matsuyama, Kanagawa (JP); Wataru Hoshino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/174,304

(22) Filed: Feb. 24, 2023

(65) Prior Publication Data
US 2023/0303926 A1    Sep. 28, 2023

(30) Foreign Application Priority Data
Mar. 28, 2022  (JP) .................... 2022-052120

(51) Int. Cl.
*C09K 19/30* (2006.01)
*C08K 5/12* (2006.01)
*C09K 19/10* (2006.01)

(52) U.S. Cl.
CPC ............ *C09K 19/3068* (2013.01); *C08K 5/12* (2013.01); *C09K 19/10* (2013.01); *C09K 2219/03* (2013.01)

(58) Field of Classification Search
CPC .................................................... C09K 19/30
See application file for complete search history.

(56) References Cited

U.S. PATENT DOCUMENTS

| | | | |
|---|---|---|---|
| 2019/0071571 A1 | 3/2019 | Takada et al. | |
| 2020/0033663 A1* | 1/2020 | Hoshino | G02B 5/3083 |
| 2022/0213385 A1* | 7/2022 | Hoshino | C08F 22/20 |

FOREIGN PATENT DOCUMENTS

| | | | | |
|---|---|---|---|---|
| JP | 2008214269 A | * | 9/2008 | |
| WO | 2017/195833 A1 | | 11/2017 | |
| WO | WO-2021059819 A1 | * | 4/2021 | C08F 20/00 |

OTHER PUBLICATIONS

Machine Translation of JP2008214269 (Year: 2024).*

* cited by examiner

*Primary Examiner* — Chanceity N Robinson
(74) *Attorney, Agent, or Firm* — Edwards Neils LLC; Jean C. Edwards, Esq.

(57) ABSTRACT

A liquid crystal composition capable of forming a light absorption anisotropic layer with an excellent surface state and an excellent alignment degree, a light absorption anisotropic layer, a laminate, and an image display device. The liquid crystal composition is a liquid crystal composition including a liquid crystal compound A represented by Formula (I) Q1-V1-SP1-X1-(Ma-La)na-X2-SP2-V2-Q2, a compound B represented by Formula (II) Q1-V1-SP1-X1-(Mb-Lb)nb-SP3-(Mc-Lc)nc-X2-SP2-V2-Q2, and a dichroic substance.

12 Claims, No Drawings

LIQUID CRYSTAL COMPOSITION, LIGHT ABSORPTION ANISOTROPIC LAYER, LAMINATE, AND IMAGE DISPLAY DEVICE

CROSS-REFERENCE TO RELATED APPLICATIONS

The present application claims priority under 35 U.S.C. § 119 to Japanese Patent Application No. 2022-052120, filed on Mar. 28, 2022. The above application is hereby expressly incorporated by reference, in its entirety, into the present application.

BACKGROUND OF THE INVENTION

1. Field of the Invention

The present invention relates to a liquid crystal composition, a light absorption anisotropic layer, a laminate, and an image display device.

2. Description of the Related Art

In the related art, in a case where an attenuation function, a polarization function, a scattering function, a light-shielding function of irradiation light including laser light or natural light is required, a device that is operated according to principles different for each function is used. Therefore, products corresponding to the above-described functions are also produced by production processes different for each function.

For example, a linear polarizer or a circular polarizer is used in an image display device (for example, a liquid crystal display device) to control optical revolution or birefringence in display. Further, a circular polarizer is used in an organic light emitting diode (OLED) to prevent reflection of external light.

In the related art, iodine has been widely used as a dichroic substance in these polarizers, but a polarizer that uses an organic coloring agent in place of iodine as a dichroic substance has also been examined.

For example, WO2017/195833A describes a light absorption anisotropic LAYER formed of a composition containing a dichroic substance having a predetermined structure ([claim 1] and [claim 14]).

SUMMARY OF THE INVENTION

As a result of examination on the composition described in WO2017/195833A, the present inventors found that in a case where a liquid crystal composition containing a dichroic substance and a liquid crystal compound is used, the surface state and the alignment degree of the light absorption anisotropic layer to be formed are degraded in some cases depending on the components of the liquid crystal composition.

Therefore, an object of the present invention is to provide a liquid crystal composition capable of forming a light absorption anisotropic layer with an excellent surface state and an excellent alignment degree, a light absorption anisotropic layer, a laminate, and an image display device.

As a result of intensive examination conducted by the present inventors in order to achieve the above-described object, it was found that a light absorption anisotropic layer with an excellent surface state and an excellent alignment degree can be formed by using a liquid crystal composition containing a liquid crystal compound A represented by a predetermined formula, a compound B represented by a predetermined formula, and a dichroic substance.

That is, the present inventors found that the above-described object can be achieved by employing the following configurations.

[1] A liquid crystal composition comprising: a liquid crystal compound A represented by Formula (I); a compound B represented by Formula (II); and a dichroic substance.

[2] The liquid crystal composition according to [1], in which at least one of the liquid crystal compound A or the compound B is a compound exhibiting a liquid crystal state of a smectic phase.

[3] The liquid crystal composition according to [1] or [2], in which a ratio of a mass of the compound B to a mass of the liquid crystal compound A is in a range of 0.001 to 0.04.

[4] The liquid crystal composition according to any one of [1] to [3], in which a structure represented by -(Ma-La)na- in Formula (I) and a structure represented by -(Mb-Lb)nb in Formula (II) are the same structure.

[5] The liquid crystal composition according to any one of [1] to [4], in which a structure represented by -(Ma-La)na- in Formula (I) and a structure represented by -(Mc-Lc)nc in Formula (II) are the same structure.

[6] A light absorption anisotropic layer which is formed of the liquid crystal composition according to any one of [1] to [5].

[7] A laminate comprising: a base material; an alignment film provided on the base material; and the light absorption anisotropic layer according to [6] which is provided on the alignment film.

[8] An image display device comprising: the light absorption anisotropic layer according to [6]; or the laminate according to [7].

According to the present invention, it is possible to provide a liquid crystal composition capable of forming a light absorption anisotropic layer with an excellent surface state and an excellent alignment degree, a light absorption anisotropic layer, a laminate, and an image display device.

DESCRIPTION OF THE PREFERRED EMBODIMENTS

Hereinafter, the present invention will be described in detail.

The description of constituent requirements described below may be made based on typical embodiments of the present invention, but the present invention is not limited to such embodiments.

In addition, in the present specification, a numerical range shown using "to" indicates a range including numerical values described before and after "to" as a lower limit and an upper limit.

Further, in the present specification, the concepts of the liquid crystal composition and the liquid crystal compound also include those that no longer exhibit liquid crystallinity due to curing or the like.

Further, in the present specification, materials corresponding to respective components may be used alone or in combination of two or more kinds thereof. Here, in a case where two or more kinds of substances corresponding to respective components are used in combination, the content of the components indicates the total content of the combined substances unless otherwise specified.

Further, in the present specification, "(meth)acrylate" is a notation representing "acrylate" or "methacrylate", "(meth)

acryl" is a notation representing "acryl" or "methacryl", and "(meth)acryloyl" is a notation representing "acryloyl" or "methacryloyl".

Liquid Crystal Composition

A liquid crystal composition according to the embodiment of the present invention is a liquid crystal composition containing a liquid crystal compound A represented by Formula (I), a compound B represented by Formula (II), and a dichroic substance.

In the present invention, as described above, a light absorption anisotropic layer with an excellent surface state and an excellent alignment degree can be formed by using a liquid crystal composition containing a liquid crystal compound A represented by Formula (I), a compound B represented by Formula (II), and a dichroic substance.

The reason for this is not clear, but the present inventors presume as follows.

That is, in the present invention, it is considered that crystallization of the liquid crystal compound A represented by Formula (I) during formation of the light absorption anisotropic layer can be suppressed by blending the compound B represented by Formula (II) with the compound A, and thus the surface state and the alignment degree of the light absorption anisotropic layer to be formed are enhanced.

Hereinafter, each component of the liquid crystal composition according to the embodiment of the present invention will be described.

Liquid Crystal Compound A

The liquid crystal composition contains a liquid crystal compound A represented by Formula (I).

Q1-V1-SP1-X1-(Ma-La)na-X2-SP2-V2-Q2        Formula (I)

In Formula (I), Q1 and Q2 each independently represent a hydrogen atom or a monovalent organic group.

Further, V1, V2, X1, and X2 each independently represent a single bond or a divalent linking group.

Further, SP1 and SP2 each independently represent a divalent spacer group.

Further, na represents an integer of 2 to 10.

Further, Ma represents an aromatic ring, an aliphatic ring, or a heterocyclic ring which may have a substituent.

Here, a plurality of Ma's may be the same as or different from each other.

Further, La represents a single bond or a divalent linking group. Here, a plurality of La's may be the same as or different from each other. Further, in a case where La present between Ma and Ma represents a divalent linking group, a divalent linking group consisting of a divalent linear spacer group having three or more atoms constituting the main chain of a bonding site and two or more carbon atoms is excluded.

Examples of the monovalent organic group represented by an aspect of Q1 and Q2 include an alkyl group, an alkoxy group, an alkenyl group, an alkynyl group, an aryl group, a heteroaryl group, a cyano group, a nitro group, and a polymerizable group.

Among these, from the viewpoint of easily fixing the light absorption anisotropic layer to be formed, in Q1 and Q2 of Formula (I), it is preferable that at least one of Q1 or Q2 represents a polymerizable group and more preferable that both Q1 and Q2 represent a polymerizable group.

As the polymerizable group, a polymerizable group that is radically polymerizable (radically polymerizable group) or a polymerizable group that is cationically polymerizable (cationically polymerizable group) is preferable.

As the radically polymerizable group, a known radically polymerizable group can be used, and an acryloyloxy group or a methacryloyloxy group is preferable. It is known that the acryloyloxy group tends to have a high polymerization rate, and the acryloyloxy group is preferable from the viewpoint of improving productivity, but the methacryloyloxy group can also be used as the polymerizable group.

As the cationically polymerizable group, a known cationically polymerizable group can be used, and examples thereof include an alicyclic ether group, a cyclic acetal group, a cyclic lactone group, a cyclic thioether group, a spiroorthoester group, and a vinyloxy group. Among these, an alicyclic ether group or a vinyloxy group is preferable, and an epoxy group, an oxetanyl group, or a vinyloxy group is more preferable.

Preferred examples of the polymerizable group include polymerizable groups represented by Formulae (P-1) to (P-30).

(P-1)

(P-2)

(P-3)

(P-4)

(P-5)

(P-6)

(P-7)

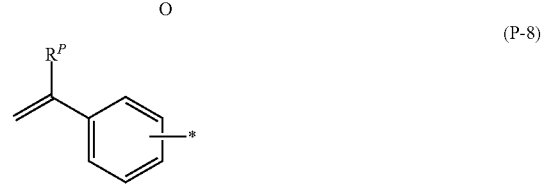
(P-8)

-continued
(P-9) 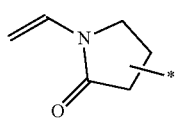
(P-10) 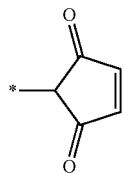
(P-11) 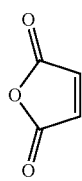
(P-12) 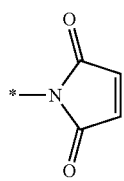
(P-13) 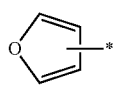
(P-14) 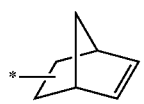
(P-15) 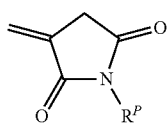
(P-16) 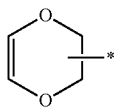
(P-17) 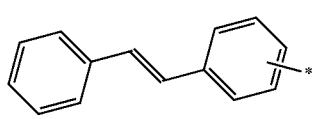
(P-18) 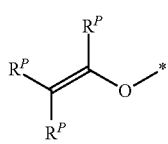
(P-19) 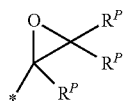
-continued
(P-20) 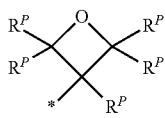
(P-21) 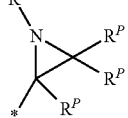
(P-22) 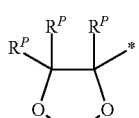
(P-23) 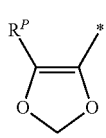
(P-24) 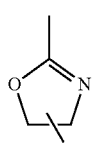
(P-25) 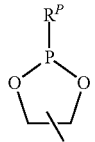
(P-26) 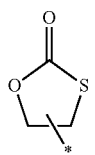
(P-27) 
(P-28) 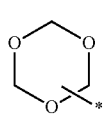
(P-29) 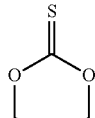
(P-30) 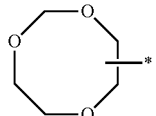
In Formulae (P-1) to (P-30), $R^P$ represents a hydrogen atom, a halogen atom, a linear, branched, or cyclic alkylene group having 1 to 10 carbon atoms, a halogenated alkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), or a sulfate group (—OSO$_3$H). A plurality of $R^P$'s may be the same as or different from each other.

Among these, a vinyl group represented by Formula (P-1), a butadiene group represented by Formula (P-2), a (meth)acrylic group represented by Formula (P-3), a (meth)acryloyloxy group represented by Formula (P-4), a (meth)acrylamide group represented by Formula (P-5), a vinyl acetate group represented by Formula (P-6), a fumaric acid ester group represented by Formula (P-7), a styryl group represented by Formula (P-8), a vinylpyrrolidone group represented by Formula (P-9), a maleic acid anhydride represented by Formula (P-11), or a maleimide group represented by Formula (P-12) is preferable as the radically polymerizable group, and a vinyl ether group represented by Formula (P-18), an epoxy group represented by Formula (P-19), or an oxetanyl group represented by Formula (P-20) is preferable as the cationically polymerizable group.

In Formula (I), examples of the divalent linking group represented by an aspect of V1, V2, X1, X2, and La include —O—, —(CH$_2$)$_g$—, —(CF$_2$)$_g$—, —Si(CH$_3$)$_2$—, —(Si(CH$_3$)$_2$O)$_g$—, —(OSi(CH$_3$)$_2$)$_g$— [g represents an integer of 1 to 10], —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— [Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. V1, V2, X1, X2, and La may represent a group obtained by combining two or more of these groups.

Among these divalent linking groups, —CO—, —O—, —S—, —C(=S)—, —C(Z)(Z')—, —C(Z)=C(Z')—, —N(Z)—, or a divalent linking group consisting of a combination of two or more of these groups is preferable.

Further, among the divalent linking groups represented by an aspect of La, a divalent linking group (for example, —O—CH$_2$—CH$_2$—O—) consisting of a divalent linear spacer group having three or more atoms constituting the main chain of a bonding site and two or more carbon atoms is excluded as La present between Ma and Ma, as described above. Further, this exclusion rule is a rule in consideration of the distinction from the compound B represented by Formula (II), that is, the distinction from SP3 in Formula (II).

In Formula (I), examples of the divalent spacer group represented by SP1 and SP2 include a linear, branched, or cyclic alkylene group having 1 to 50 carbon atoms and a heterocyclic group having 1 to 20 carbon atoms.

The carbon atoms of the alkylene group and the carbon atoms of the heterocyclic group may be substituted with —O—, —Si(CH$_3$)$_2$—, —(Si(CH$_3$)$_2$O)$_g$—, —(OSi(CH$_3$)$_2$)$_g$—[g represents an integer of 1 to 10], —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— [Z, Z', and Z" each independently represent a hydrogen atom, an alkyl group having 1 to 4 carbon atoms, a cycloalkyl group, an aryl group, a cyano group, or a halogen atom], —C≡C—, —N=N—, —S—, —C(S)—, —S(O)—, —SO$_2$—, —(O)S(O)O—, —O(O)S(O)O—, —SC(O)—, —C(O)S—, or a group obtained by combining two or more of these groups.

Further, the hydrogen atoms of the alkylene group and the hydrogen atoms of the heterocyclic group may be substituted with a halogen atom, a cyano group, —$Z^H$, —OH, —$OZ^H$, —COOH, —C(O)$Z^H$, C(O)O$Z^H$, —OC(O)$Z^H$, —OC(O)O$Z^H$, —N$Z^H Z^{Hı}$, —N$Z^H$C(O)$Z^H$, —N$Z^H$C(O)O$Z^{Hı}$, —C(O)N$Z^H Z^{Hı}$, —OC(O)N$Z^H Z^{Hı}$, —N$Z^H$C(O)N$Z^{Hı}$O$Z^{Hıı}$, —SH, —S$Z^H$, —C(S)$Z^H$, —C(O)S$Z^H$, or —SC(O)$Z^H$. Here, $Z^H$, $Z^{Hı}$, and Z" each independently represent an alkyl group having 1 to 10 carbon atoms, a halogenated alkyl group, or -L-Q [L represents a single bond or a divalent linking group, and specific examples of the divalent linking group are the same as those for V1 described above, Q represents a crosslinkable group, examples of suitable aspects of Q1 or Q2 include a polymerizable group, and among these, a polymerizable group represented by any of Formulae (P-1) to (P-30) is preferable].

Further, as the divalent spacer group represented by SP1 and SP2, a linear alkylene group having 1 to 12 carbon atoms, a branched alkylene group having 3 to 12 carbon atoms, or a divalent linking group in which one or more —CH$_2$—'s constituting these alkylene groups have been substituted with —O—, —S—, —NH—, —N(Z)—, or —CO— is preferable.

In Formula (I), MA represents an aromatic ring, an aliphatic ring, or a heterocyclic ring, which may have a substituent and preferably a 4- to 15-membered ring. MA may represent a monocyclic ring or a fused ring, and a plurality of MA's may be the same as or different from each other.

Examples of the aromatic ring represented by MA include a phenylene group, a naphthylene group, a fluorene-diyl group, an anthracene-diyl group, and a tetracene-diyl group. From the viewpoints of design diversity of a mesogenic skeleton and the availability of raw materials, a phenylene group or a naphthylene group is preferable.

Examples of the aliphatic ring represented by MA include a cyclopentylene group and a cyclohexylene group, and the carbon atoms thereof may be substituted with —O—, —Si(CH$_3$)$_2$—, —N(Z)— [Z represents a hydrogen atom, an alkyl group having 1 to 4 carbon atoms, a cycloalkyl group, an aryl group, a cyano group, or a halogen atom], —C(O)—, —S—, —C(S)—, —S(O)—, —SO₂—, or a group obtained by combining two or more of these groups.

Examples of the atoms other than carbon constituting the heterocyclic ring represented by MA include a nitrogen atom, a sulfur atom, and an oxygen atom. In a case where the heterocyclic ring has a plurality of atoms constituting a ring other than carbon, these may be the same as or different from each other. Specific examples of the heterocyclic ring include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, a thienooxazole-diyl group, and the following structures (II-1) to (II-4).

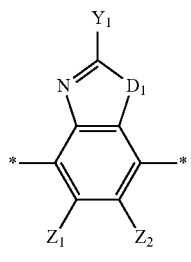

(II-1)

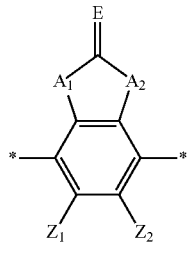

(II-2)

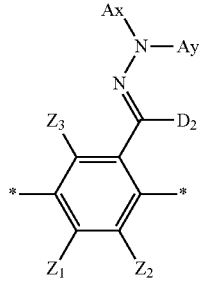

(II-3)

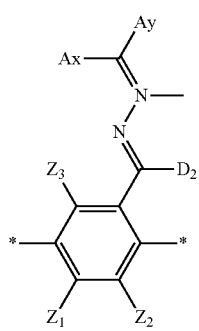

(II-4)

In Formulae (II-1) to (II-4), $D_1$ represents —S—, —O—, or $NR^{11}$—, and $R^{11}$ represents a hydrogen atom or an alkyl group having 1 to 6 carbon atoms.

$Y_1$ represents an aromatic hydrocarbon group having 6 to 12 carbon atoms or an aromatic heterocyclic group having 3 to 12 carbon atoms.

$Z_1$, $Z_2$, and $Z_3$ each independently represent a hydrogen atom, an aliphatic hydrocarbon group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, $-NR^{12}R^{13}$, or $SR^{12}$.

Here, $Z^1$ and $Z^2$ may be bonded to each other to form an aromatic ring or an aromatic heterocyclic ring, and $R^{12}$ and $R^{13}$ each independently represent a hydrogen atom or an alkyl group having 1 to 6 carbon atoms.

$A_1$ and $A_2$ each independently represent a group selected from the group consisting of —O—, $-NR^{21}$— ($R^{21}$ represents a hydrogen atom or a substituent), —S—, and —CO—.

E represents a non-metal atom of a Group 14 to a Group 16 to which a hydrogen atom or a substituent may be bonded.

Ax represents an organic group having 2 to 30 carbon atoms and at least one aromatic ring selected from the group consisting of an aromatic hydrocarbon ring and an aromatic heterocyclic ring.

Ay represents a hydrogen atom, an alkyl group having 1 to 6 carbon atoms which may have a substituent, or an organic group having 2 to 30 carbon atoms and at least one aromatic ring selected from the group consisting of an aromatic hydrocarbon ring and an aromatic heterocyclic ring, the aromatic rings of Ax and Ay may have a substituent, and Ax and Ay may be bonded to each other to form a ring.

$D_2$ represents a hydrogen atom or an alkyl group having 1 to 6 carbon atoms which may have a substituent.

In Formula (II-2), in a case where $Y_1$ represents an aromatic hydrocarbon group having 6 to 12 carbon atoms, the aromatic hydrocarbon group may be monocyclic or polycyclic. In a case where $Y_1$ represents an aromatic heterocyclic group having 3 to 12 carbon atoms, the aromatic heterocyclic group may be monocyclic or polycyclic.

In Formula (II-2), in a case where $A_1$ and $A_2$ represent $-NR^{21}$—, the substituent as $R^{21}$ can refer to, for example, the description in paragraphs [0035] to [0045] of JP2008-107767A, and the content thereof is incorporated in the present specification.

In Formula (II-2), in a case where X represents a non-metal atom of a Group 14 to a Group 16 to which a substituent may be bonded, =O, =S, =NR', or =C(R')R' is preferable. R' represents a substituent, and the substituent can refer to, for example, the description in paragraphs [0035] to [0045] of JP2008-107767A, and a nitrogen atom is preferable.

Examples of the substituent that an aromatic ring, an aliphatic ring, or a heterocyclic ring as MA in Formula (I) may have include a halogen atom, an alkyl group having 1 to 20 carbon atoms, a halogenated alkyl group having 1 to 20 carbon atoms, a cycloalkyl group having 1 to 20 carbon atoms, an alkoxy group having 1 to 20 carbon atoms, an alkenyl group having 1 to 20 carbon atoms, an alkynyl group having 1 to 20 carbon atoms, an aryl group having 1 to 20 carbon atoms, a heterocyclic group, a cyano group, a hydroxy group, a nitro group, a carboxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl or arylsulfonylamino group, a mercapto group, an alkylthio group, an arylthio group, a heterocyclic thio group, a sulfamoyl group, a sulfo group, an alkyl or arylsulfinyl group, an alkyl or arylsulfonyl group, an acyl group, an aryloxycarbonyl group, an alkoxycarbonyl group, a carbamoyl group, an aryl or heterocyclic azo group, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), and other known substituents.

The details of the substituent are described in paragraph [0023] of JP2007-234651A.

In Formula (I), na represents an integer of 2 to 10, preferably an integer of 2 to 8, and more preferably an integer of 2 to 5.

Examples of the liquid crystal compound A include the compounds described in paragraphs [0033] to [0039] of JP2008-19240A and the structures shown below, but the examples are not limited thereto.

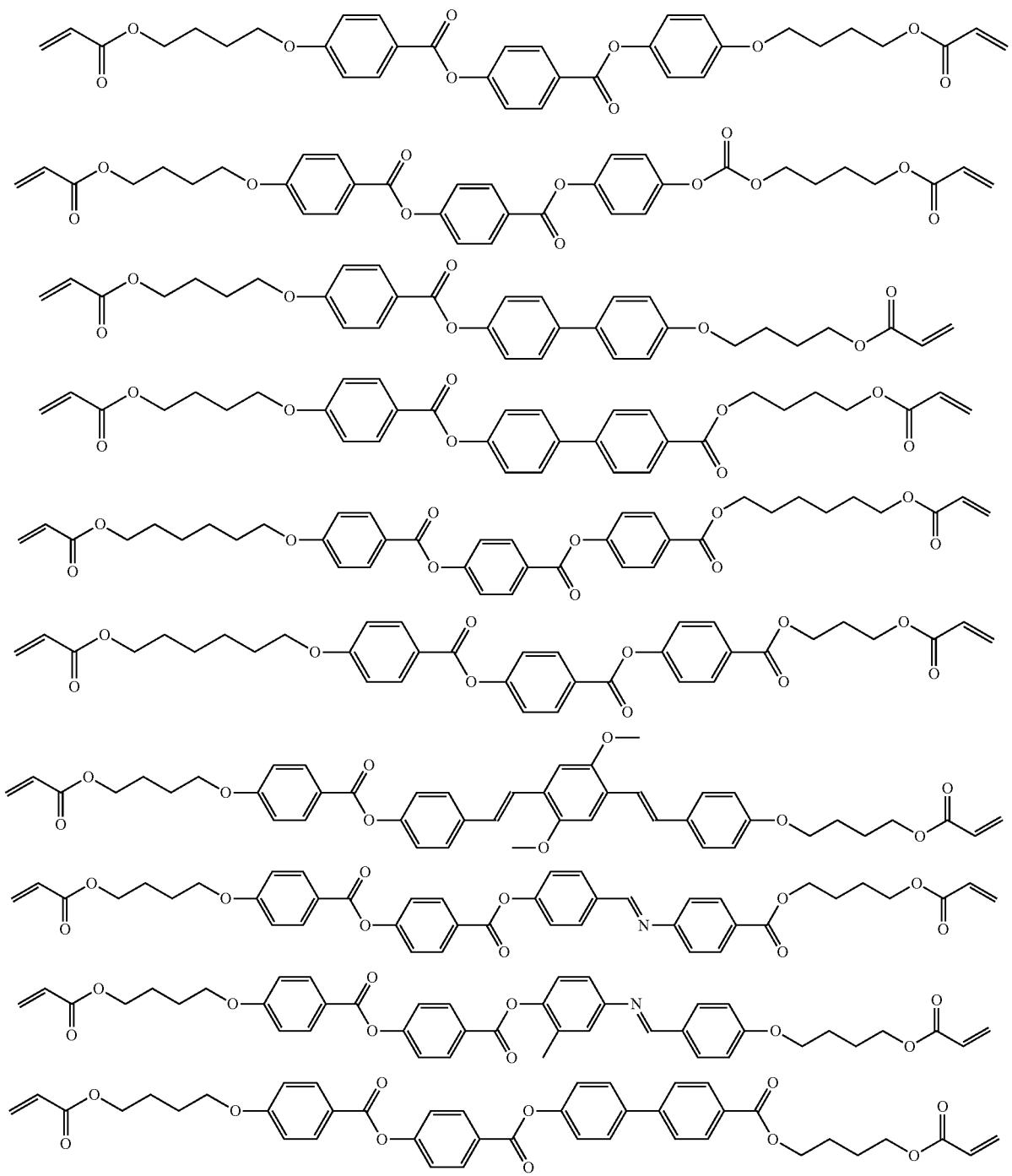

-continued
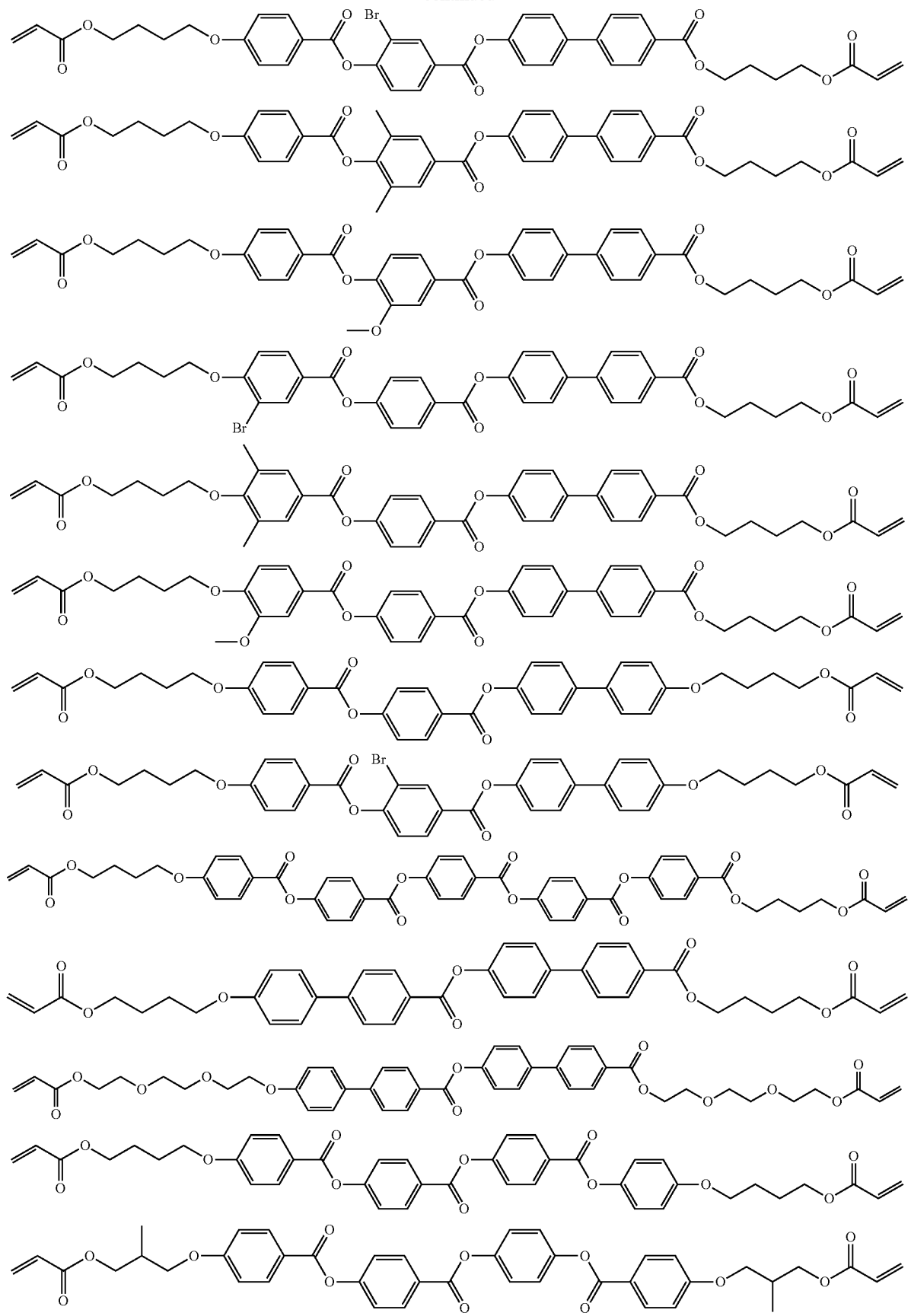

-continued
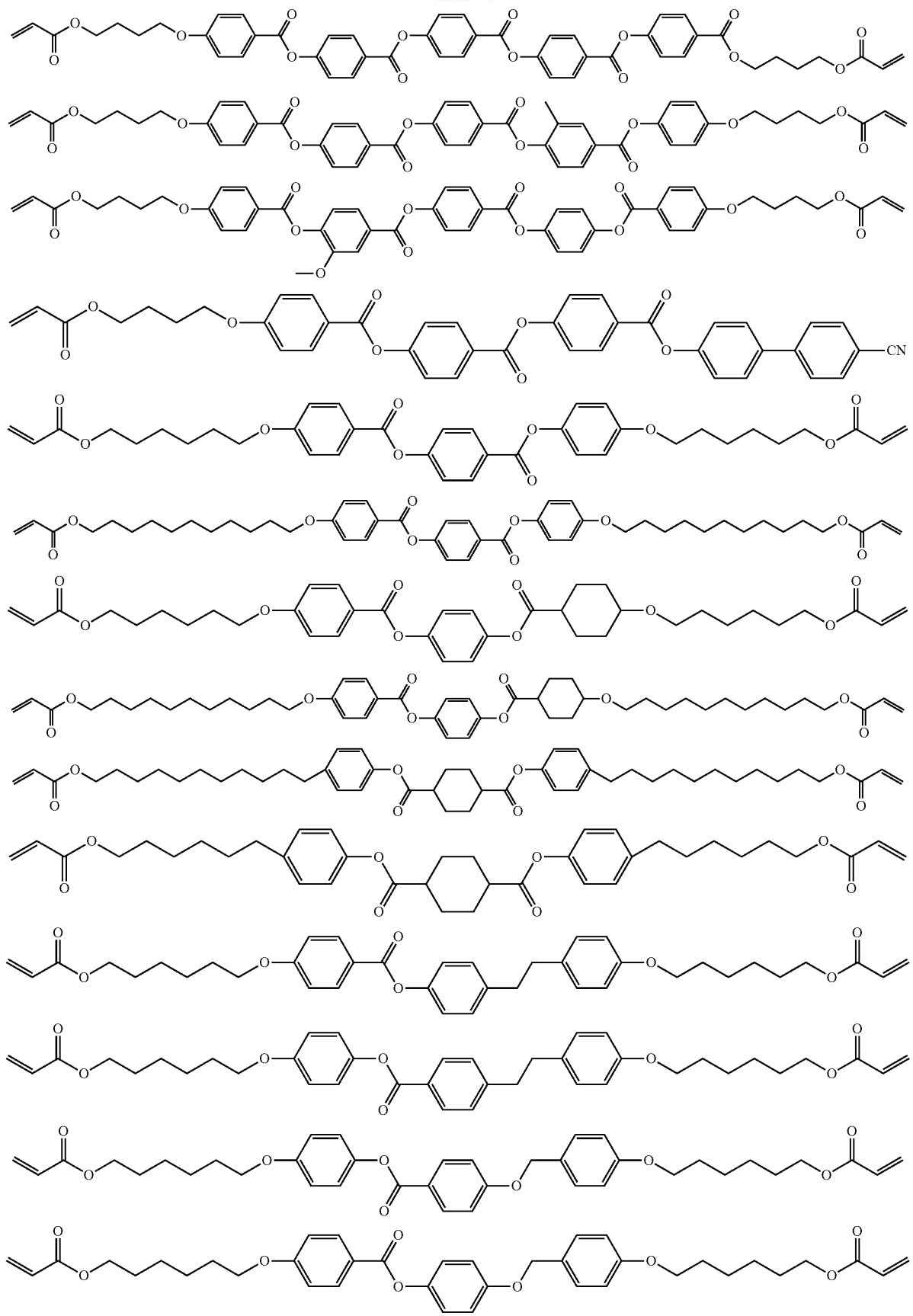

-continued

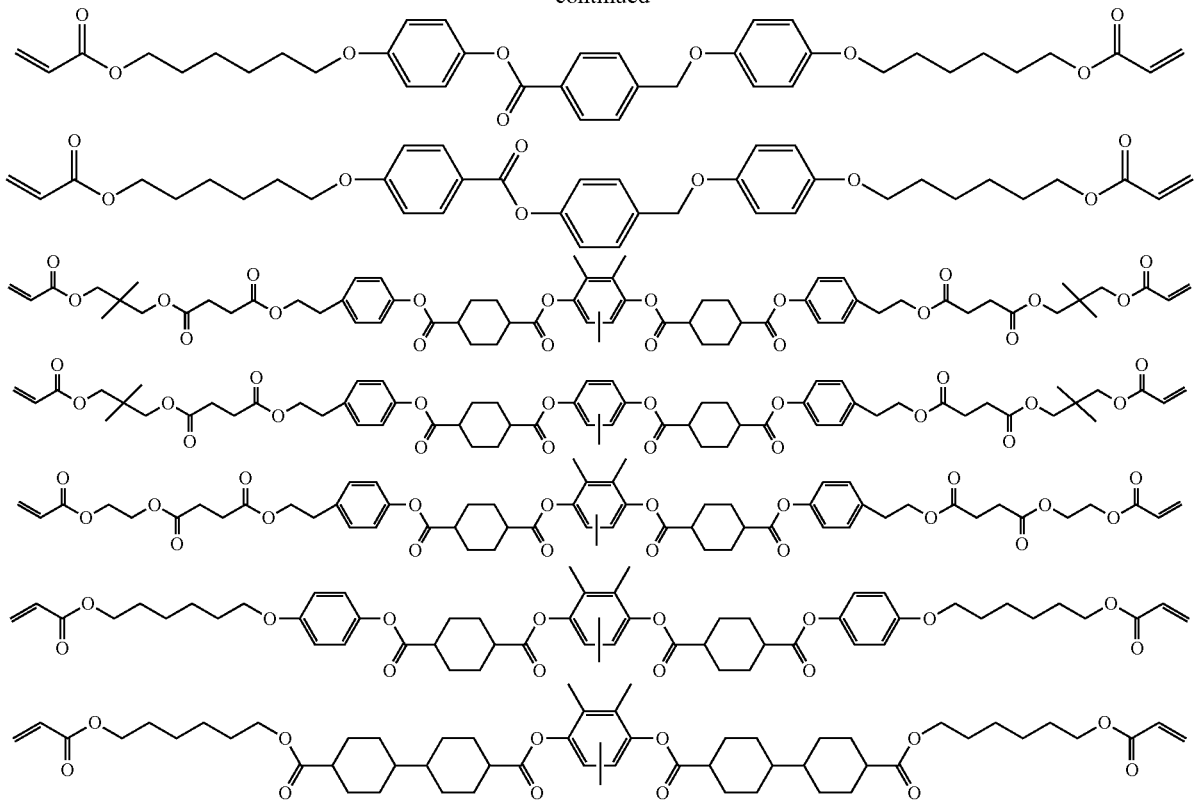

In the five structural formulae shown above, the notation of a methyl group that has not specified the substitution position of a benzene ring at the center denotes a mixture of regioisomers in which the methyl group is substituted at the ortho position or the meta position of the benzene ring. Similarly, the notation of a group containing a methyl group that is adjacent to an acryloyloxy group and has not specified the substitution position denotes a propylene group (group in which a methyl group is substituted with an ethylene group) and denotes a mixture of regioisomers in which the positions of methyl groups are different from each other. The notation here is similarly applied to the specific examples of the compound B described below.

The content of the liquid crystal compound A is preferably in a range of 50% to 99% by mass and more preferably in a range of 60% to 95% by mass with respect to the total solid content (100% by mass) of the liquid crystal compound.

Compound B

The liquid crystal composition contains a compound B represented by Formula (II).

Q1-V1-SP1-X1-(M$b$-L$b$)$nb$-SP3-(M$c$-L$c$)$nc$-X2-SP2-V2-Q2    Formula (II)

In Formula (II), Q1 and Q2 each independently represent a hydrogen atom or a monovalent organic group.

Further, V1, V2, X1, and X2 each independently represent a single bond or a divalent linking group.

Further, SP1 and SP2 each independently represent a divalent spacer group.

Further, SP3 represents a divalent linear spacer group having three or more atoms constituting the main chain of a bonding site and two or more carbon atoms.

Further, nb and nc each independently represent an integer of 2 to 10.

Further, Mb and Mc each independently represent an aromatic ring, an aliphatic ring, or a heterocyclic ring which may have a substituent. Here, a plurality of Mb's may be the same as or different from each other, and a plurality of Mc's may be the same as or different from each other.

Further, Lb and Lc each independently represent a single bond or a divalent linking group. Here, a plurality of Lb's may be the same as or different from each other, and a plurality of Lc's may be the same as or different from each other.

Here, Q1 and Q2 in Formula (II) each have the same definition as that for Q1 and Q2 in Formula (I). From the viewpoint of further enhancing the surface state of the light absorption anisotropic layer to be formed, it is preferable that Q1 and Q2 in Formula (II) represent the same substituent and more preferable that both Q1 and Q2 represent an alkyl group or a polymerizable group.

Further, V1, V2, X1, and X2 each have the same definition as that for V1, V2, X1, and X2 in Formula (I).

Further, SP1 and SP2 each have the same definition as that for SP1 and SP2 in Formula (I).

Further, Mb and Mc each have the same definition as that for Ma in Formula (I).

In Formula (II), in regard to "divalent linear spacer group having three or more atoms constituting the main chain of a bonding site and two or more carbon atoms" as SP3, the number of "atoms constituting the main chain of a bonding site" denotes the number of atoms constituting the main chain of the bonding site of the divalent linear spacer group. For example, in a case where the divalent linear spacer group is "—$CH_2$—$CH_2$—O—C(=O)—$CH_2$—$CH_2$—C(=O)—O—$CH_2$—$CH_2$—", the number of atoms constituting the main chain of the bonding site is counted as 10, and the number of hydrogen atoms of the ethylene group and the number of oxygen atoms of the carbonyl group are not counted because these atoms do not constitute the main chain.

As such a divalent linear spacer group, a group containing at least an ethylene group (—$CH_2$—$CH_2$—) is preferable, and examples thereof include a linear alkylene group having 2 to 12 carbon atoms and a divalent linking group in which one or two or more noncontinuous —$CH_2$—'s among —$CH_2$—'s constituting a linear alkylene group having 2 to 12 carbon atoms, have been substituted with —O—, —S—, —NH—, —N(Z)—, or —CO— (here, the number of carbon atoms after substitution is limited to 2 or more).

In Formula (II), nb and nc each independently represent an integer of 2 to 10, and a total of nb and nc is preferably an integer of 6 to 20 and more preferably an integer of 6 to 12.

Further, nb and nc each independently represent preferably an integer of 3 to 10 and more preferably an integer of 3 to 6.

Examples of the divalent linking groups represented by an aspect of Lb and Lc in Formula (II) include the same groups as those for V1 in Formula (I).

In addition, La in Formula (I) has an exclusion rule of "a divalent linking group consisting of a divalent linear spacer group having three or more atoms constituting the main chain of a bonding site and two or more carbon atoms is excluded in a case where La present between Ma and Ma represents a divalent linking group" as described above, but Lb and Lc in Formula (II) do not have such an exclusion rule.

Examples of the compound B include the compounds described in paragraphs [0037] to [0041] of JP2008-214269A and paragraphs [0033] to [0040] of JP2006-215437A and structures shown below, but the examples are not limited thereto.

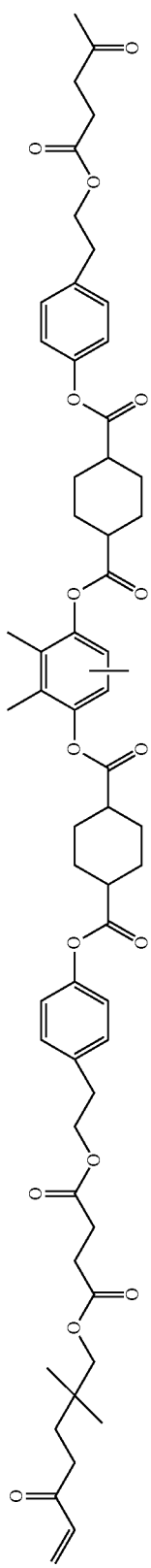
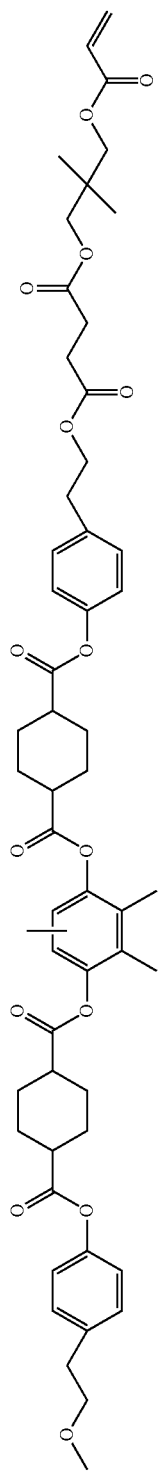
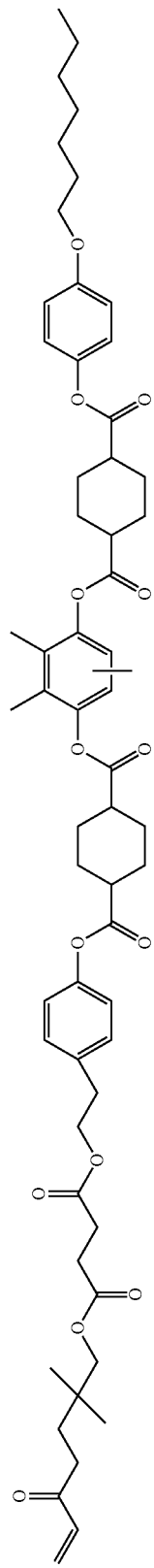
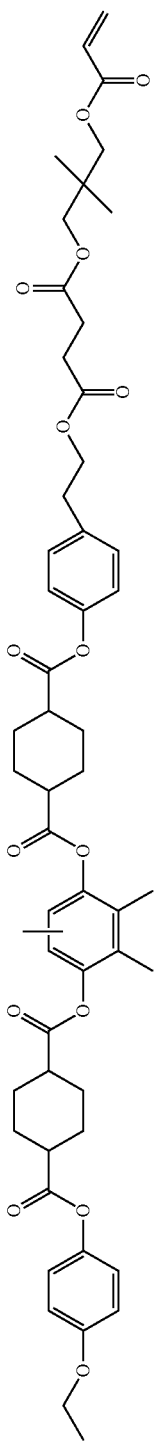

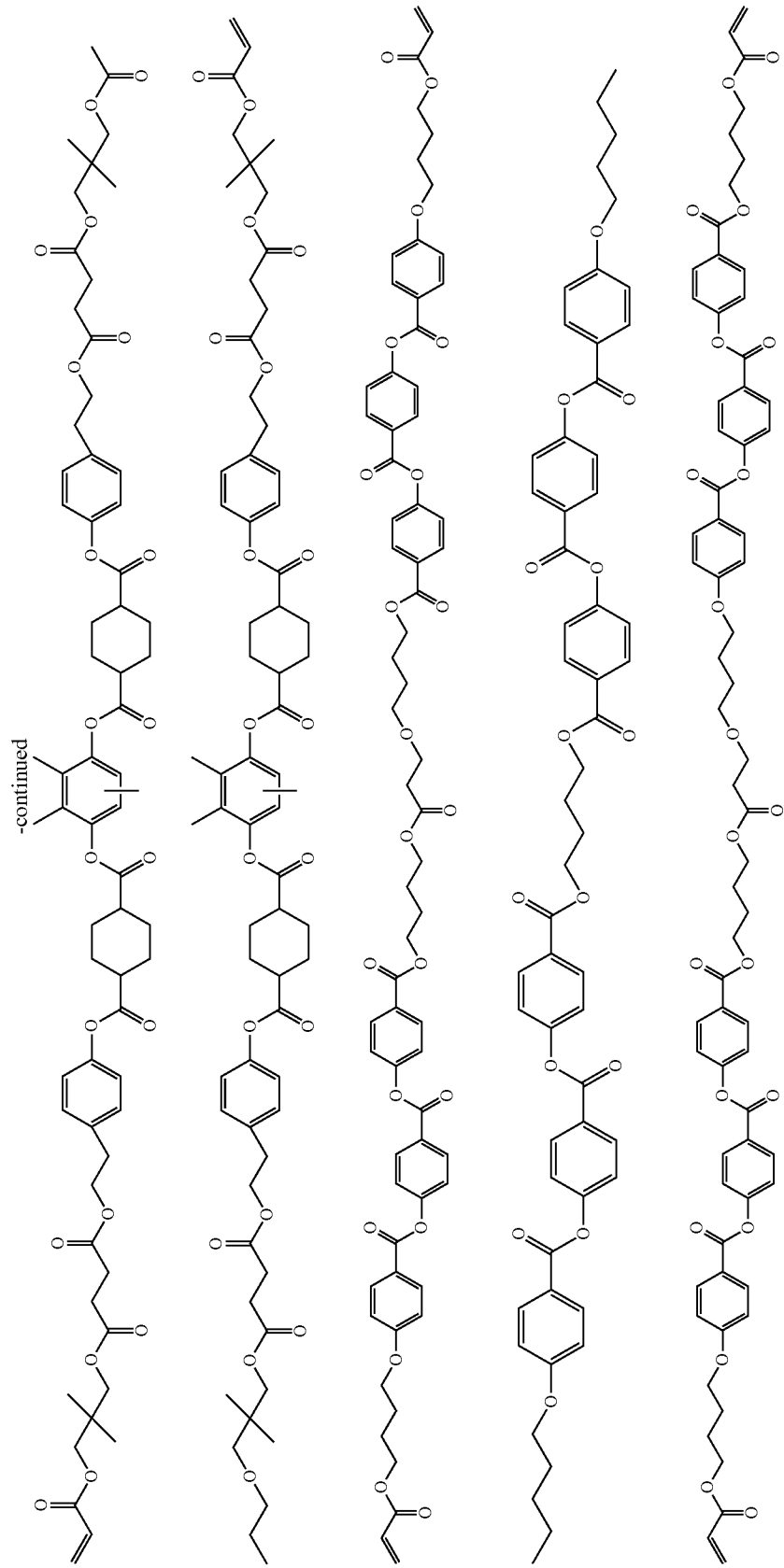

-continued
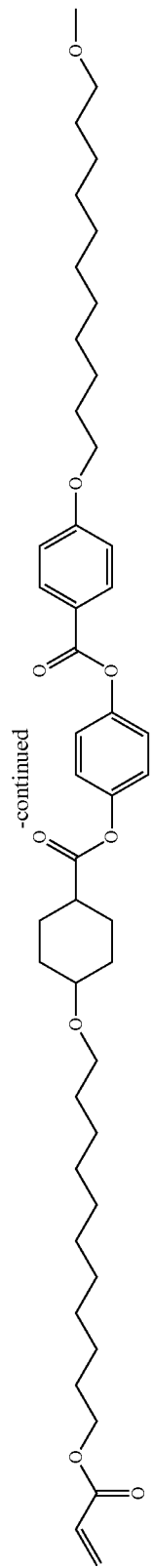
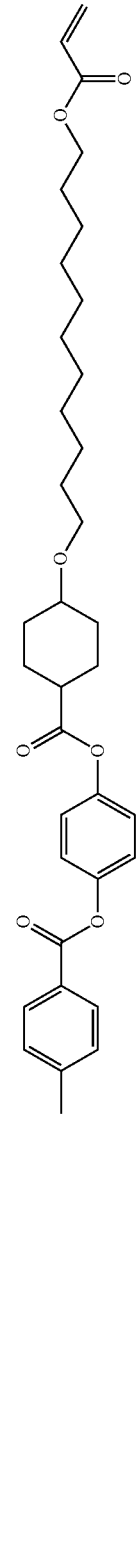
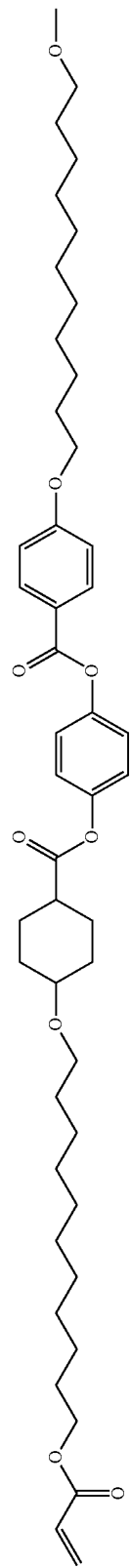
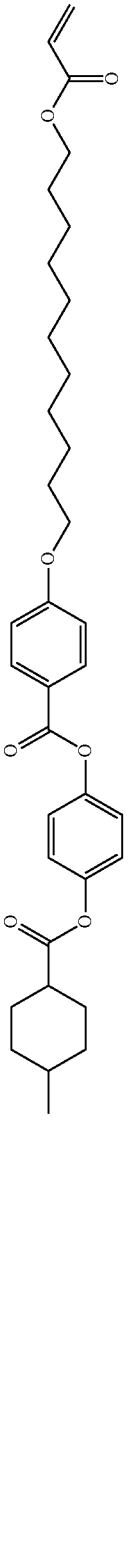
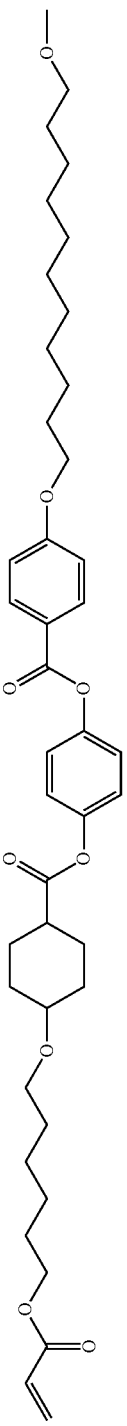
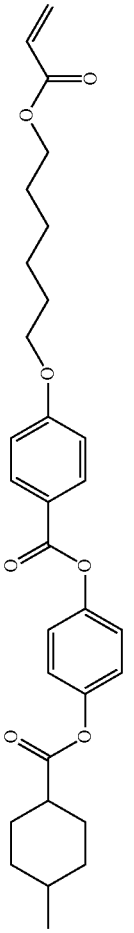

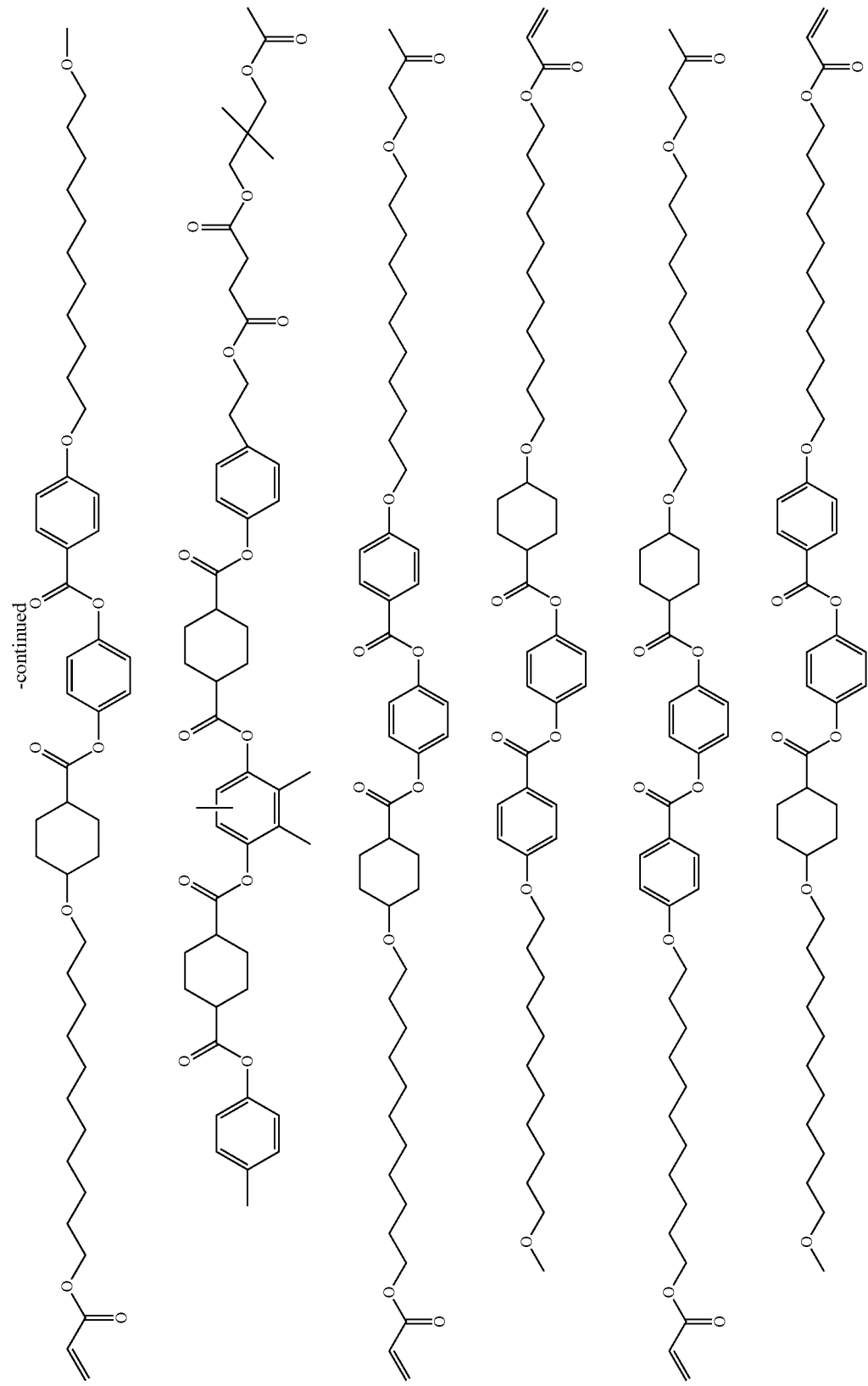

-continued
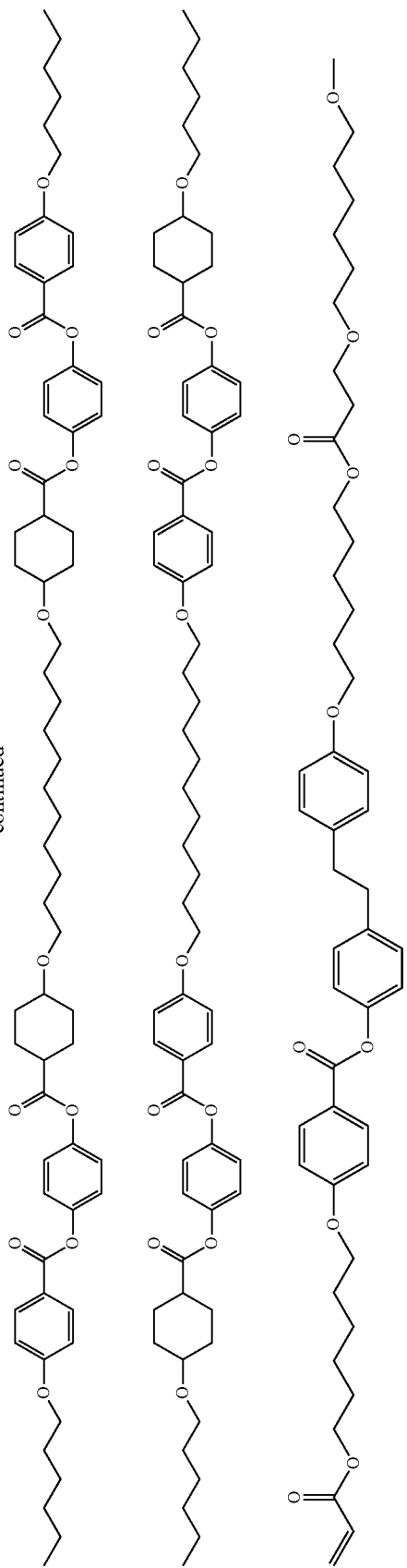
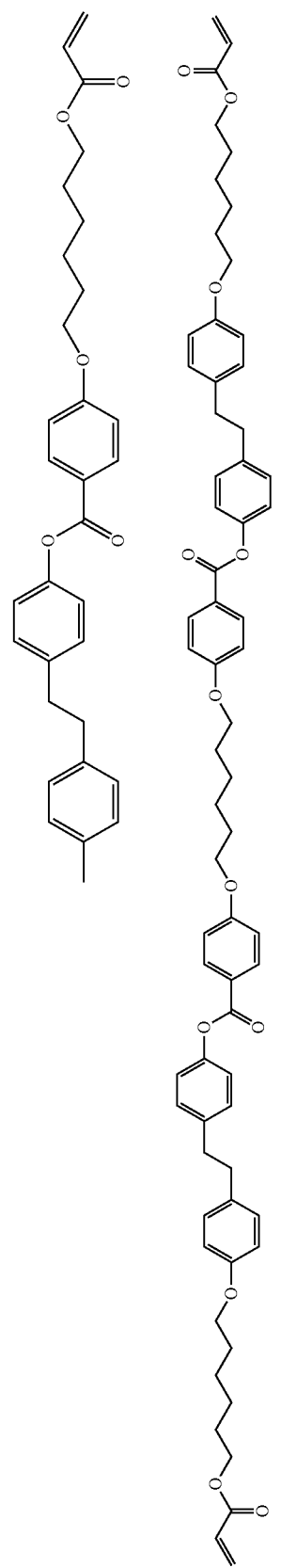
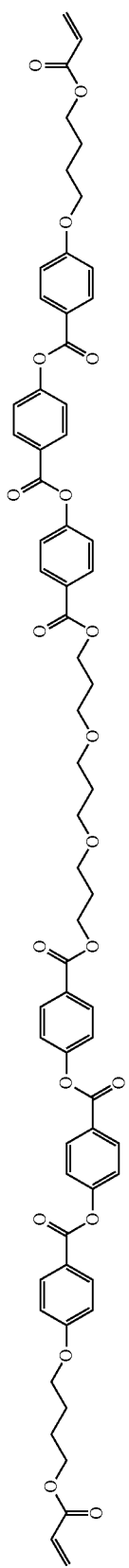

-continued
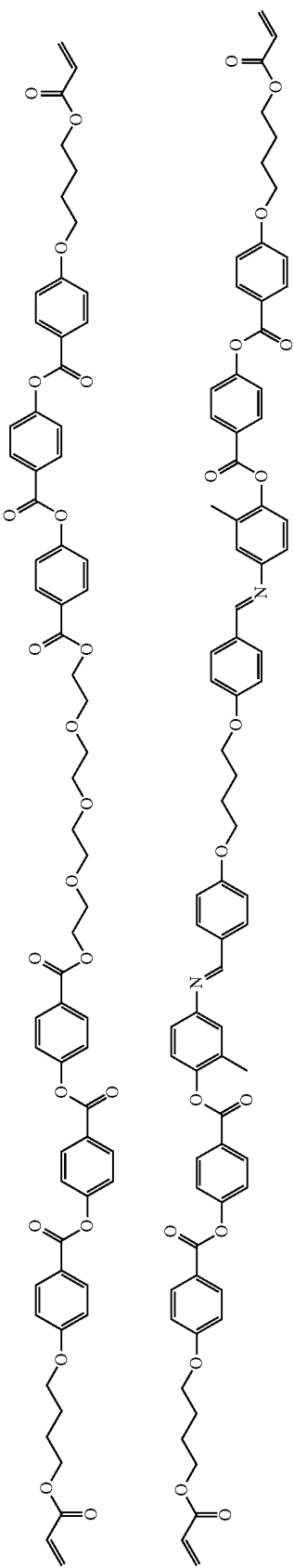
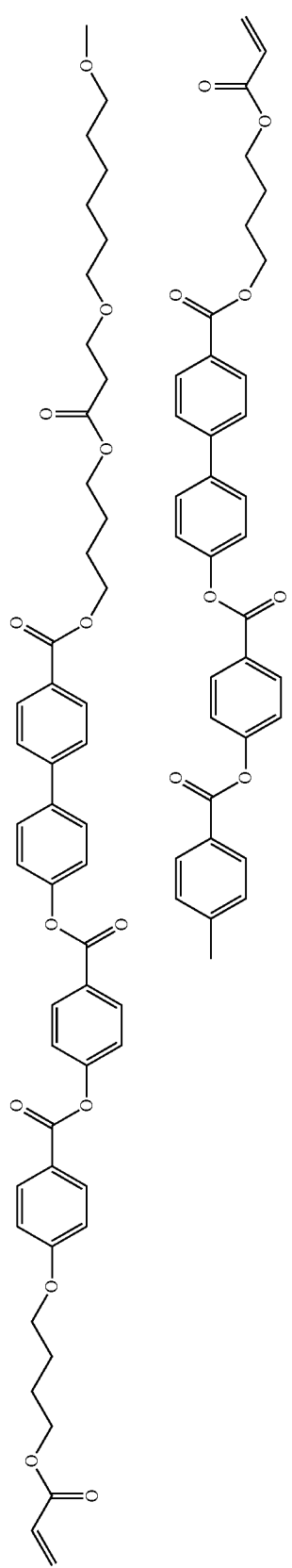
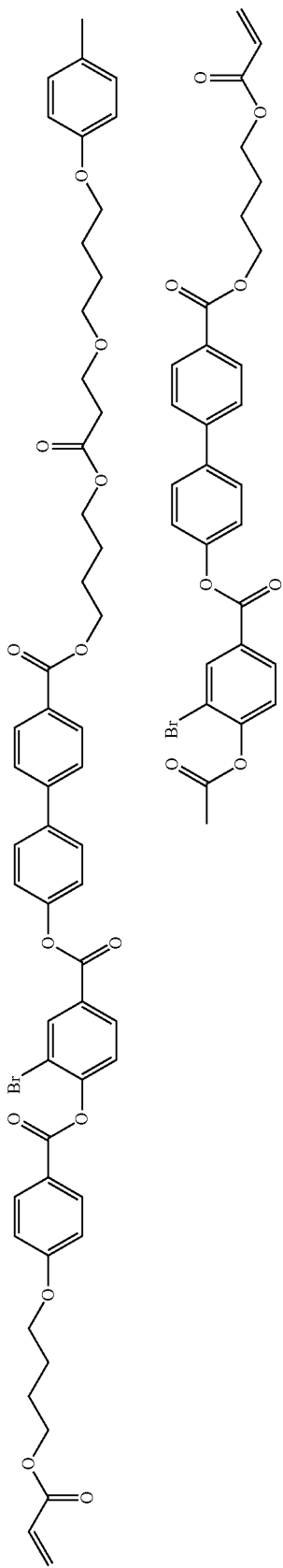

In the present invention, from the viewpoint of further increasing the alignment degree of the light absorption anisotropic layer to be formed, it is preferable that at least one of the liquid crystal compound A or the compound B is a compound exhibiting a liquid crystal state of a smectic phase.

Here, examples of the smectic phase include a smectic A phase and a smectic C phase, and a higher-order smectic phase (such as a smectic B phase, a smectic E phase, a smectic F phase, a smectic G phase, a smectic H phase, a smectic I phase, a smectic J phase, a smectic K phase, or a smectic L phase) may also be employed.

Further, the compound may exhibit a nematic phase in addition to the smectic phase.

Further, from the viewpoint of further increasing the alignment degree of the light absorption anisotropic layer to be formed, it is preferable that at least one of the liquid crystal compound A or the compound B described above is a compound exhibiting a liquid crystal state of any of a smectic B phase, a smectic E phase, a smectic F phase, a smectic G phase, a smectic H phase, a smectic I phase, a smectic J phase, a smectic K phase, or a smectic L phase.

In the present invention, from the viewpoint of further enhancing the surface state of the light absorption anisotropic layer to be formed and further increasing the alignment degree, the ratio (mass ratio) of the mass of the above-described compound B to the mass of the above-described liquid crystal compound A is preferably in a range of 0.001 to 0.04 and more preferably in a range of 0.002 to 0.035. That is, the content of the above-described compound B is preferably in a range of 0.1% to 4% by mass and more preferably in a range of 0.2% to 3.5% by mass with respect to the mass of the above-described liquid crystal compound A.

In the present invention, from the viewpoint of further enhancing the surface state of the light absorption anisotropic layer to be formed, it is preferable that the structure represented by -(Ma-La)na- in Formula (I) and the structure represented by -(Mb-Lb)nb- in Formula (II) are the same as each other.

Further, from the same viewpoint as described above, it is preferable that the structure represented by -(Ma-La)na- in Formula (I) and the structure represented by -(Mc-Lc)nc- in Formula (II) are the same as each other.

In addition, from the viewpoint of further enhancing the light absorption anisotropic layer to be formed, it is preferable that the structure represented by -(Ma-La)na- in Formula (I) and the structures represented by -(Mb-Lb)nb- and -(Mc-Lc)nc- in Formula (II) are the same as each other.

Dichroic Substance

The liquid crystal composition further contains a dichroic substance.

In the present invention, the dichroic substance denotes a coloring agent having different absorbances depending on the direction. The dichroic substance may or may not exhibit liquid crystallinity.

The dichroic substance is not particularly limited, and examples thereof include a visible light absorbing substance (dichroic coloring agent), a light emitting substance (such as a fluorescent substance or a phosphorescent substance), an ultraviolet absorbing substance, an infrared absorbing substance, a non-linear optical substance, a carbon nanotube, and an inorganic substance (for example, a quantum rod). Further, known dichroic substances (dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0014] to [0032] of JP2018-053167A, paragraphs [0014] to [0033] of JP2020-11716A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, paragraphs [0014] to [0034] of WO2018/164252A, paragraphs [0021] to [0030] of WO2018/186503A, paragraphs [0043] to [0063] of WO2019/189345A, paragraphs [0043] to [0085] of WO2019/225468A, paragraphs [0050] to [0074] of WO2020/004106A, and paragraphs [0015] to [0038] of WO2021/044843A.

In the present invention, two or more kinds of dichroic substances may be used in combination. For example, from the viewpoint of making the color of the optically anisotropic layer to be formed closer to black, it is preferable that at least one dichroic substance having a maximum absorption wavelength in a wavelength range of 370 to 550 nm and at least one dichroic substance having a maximum absorption wavelength in a wavelength range of 500 to 700 nm are used in combination.

From the viewpoint of further increasing the alignment degree of the light absorption anisotropic layer to be formed, the content of the dichroic substance is preferably in a range of 2% to 60% by mass, more preferably in a range of 3% to 50% by mass, and still more preferably in a range of 5% to 40% by mass with respect to the total solid content (100% by mass) of the liquid crystal composition. Further, in a case where a plurality of dichroic substances are used in combination, it is preferable that the total amount of the plurality of dichroic substances is in the above-described ranges.

Solvent

From the viewpoint of workability, it is preferable that the liquid crystal composition contains a solvent.

Examples of the solvent include organic solvents such as ketones (such as acetone, 2-butanone, methyl isobutyl ketone, cyclopentanone, cyclohexanone, or acetylacetone), ethers (such as dioxane, tetrahydrofuran, tetrahydropyran, dioxolane, tetrahydrofurfuryl alcohol, cyclopentyl methyl ether, or dibutyl ether), aliphatic hydrocarbons (such as hexane), alicyclic hydrocarbons (such as cyclohexane), aromatic hydrocarbons (such as benzene, toluene, xylene, tetralin, or trimethylbenzene), halogenated carbons (such as dichloromethane, trichloromethane (chloroform), dichloroethane, dichlorobenzene, 1,1,2,2-tetrachloroethane, or chlorotoluene), esters (such as methyl acetate, ethyl acetate, butyl acetate, diethyl carbonate, ethyl acetoacetate, n-pentyl acetate, ethyl benzoate, benzyl benzoate, butyl carbitol acetate, diethylene glycol monoethyl ether acetate, or iso-amyl acetate), alcohols (such as ethanol, isopropanol, butanol, cyclohexanol, furfuryl alcohol, 2-ethylhexanol, octanol, benzyl alcohol, ethanolamine, ethylene glycol, propylene glycol, diethylene glycol, diethylene glycol monomethyl ether, diethylene glycol monoethyl ether, or diethylene glycol monobutyl ether), phenols (such as phenol or cresol), cellosolves (such as methyl cellosolve, ethyl cellosolve, or 1,2-dimethoxyethane), cellosolve acetates, sulfoxides (such as dimethyl sulfoxide), amides (such as dimethylformamide, dimethylacetamide, N-methylpyrrolidone, N-ethylpyrrolidone, or 1,3-dimethyl-2-imidazolidinone), and heterocyclic compounds (such as pyridine or 2,6-lutidine), and water.

These solvents may be used alone or in combination of two or more kinds thereof.

In a case where the liquid crystal composition contains a solvent, the content of the solvent is preferably in a range of 60% to 99.5% by mass, more preferably in a range of 70% to 99% by mass, and particularly preferably in a range of 75% to 98% by mass with respect to the total mass (100% by mass) of the liquid crystal composition.

Polymerization Initiator

The liquid crystal composition may contain a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds (paragraph [0065] of JP2016-27384A), and acylphosphine oxide compounds (JP1988-40799B (JP-S63-40799B), JP1993-29234B (JP-H5-29234B), JP1998-95788A (JP-H10-95788A), and JP1998-29997A (JP-H10-29997A)).

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02 (all manufactured by BASF SE).

In a case where the liquid crystal composition contains a polymerization initiator, the content of the polymerization initiator is preferably in a range of 0.01% to 30% by mass and more preferably in a range of 0.1% to 15% by mass with respect to the total solid content (100% by mass) of the liquid crystal composition.

Interface Improver

The liquid crystal composition may contain an interface improver.

The interface improver is not particularly limited, and a polymer-based interface improver or a low-molecular-weight interface improver can be used, and the compounds described in paragraphs [0253] to [0293] of JP2011-237513A can also be used.

Further, fluorine (meth)acrylate-based polymers described in paragraphs [0018] to [0043] of JP2007-272185A can also be used.

Further, examples of the interface improver include the compound described in paragraphs [0079] to [0102] of JP2007-069471A, the polymerizable liquid crystal compounds represented by Formula (4) of JP2013-047204A (particularly the compounds described in paragraphs [0020] to [0032]), the polymerizable liquid crystal compounds represented by Formula (4) described in JP2012-211306A (particularly the compounds described in paragraphs [0022] to [0029]), the liquid crystal alignment promoters represented by Formula (4) described in JP2002-129162A (particularly the compounds described in paragraphs [0076] to [0078] and paragraphs [0082] to [0084]), the compounds represented by Formulae (4), (II), and (III) described in JP2005-099248A (particularly the compounds described in paragraphs [0092] to [0096]), the compounds described in paragraphs [0013] to [0059] of JP4385997B, the compounds described in paragraphs [0018] to [0044] of JP5034200B, and the compounds of described in paragraphs [0019] to [0038] of JP4895088B.

The interface improver may be used alone or in combination of two or more kinds thereof.

In a case where the liquid crystal composition contains an interface improver, the content of the interface improver is preferably in a range of 0.005% to 15% by mass, more preferably in a range of 0.01% to 5% by mass, and still more preferably in a range of 0.015% to 3% by mass with respect to the total solid content (100% by mass) of the liquid crystal composition. In a case where a plurality of interface improvers are used in combination, it is preferable that the total amount of the plurality of interface improvers is in the above-described ranges.

Light Absorption Anisotropic Layer

The light absorption anisotropic layer according to the embodiment of the present invention is a light absorption anisotropic layer formed of the above-described liquid crystal composition according to the embodiment of the present invention and preferably a layer in which the alignment states of the liquid crystal compound and the dichroic substance described above are fixed.

In the present invention, the structure of the above-described liquid crystal composition according to the embodiment of the present invention or the structure of the liquid crystal compound contained in the light absorption anisotropic layer according to the embodiment of the present invention can be identified by high performance chromatography (HPLC) measurement or liquid chromatography/mass spectrometry (LC/MS) using a solution of the liquid crystal composition, a solution in which the laminate including the light absorption anisotropic layer is dissolved, or an extraction liquid obtained by immersing the laminate including the light absorption anisotropic layer in a solvent; measurement of nuclear magnetic resonance (NMR) spectra of the compounds extracted from these solutions and the extraction liquid; and a thermal cracking gas chromatography method, an elemental analysis method, temperature increase type direct mass spectrometry, or a temperature-programmed desorption analysis method of the light absorption anisotropic layer, but the examples are not limited thereto. In addition, the quantification can be performed by using the substance contained in the light absorption anisotropic layer as a standard material.

Further, the region of the light absorption anisotropic layer in the laminate including the light absorption anisotropic layer can be specified by cross-sectional information using Time-of-Flight Secondary Ion Mass Spectrometry (TOF-SIMS) or by cross-sectional observation using a scanning electron microscope (SEM), but the method is not particularly limited.

Method of Forming Light Absorption Anisotropic Layer

A method of forming the light absorption anisotropic layer according to the embodiment of the present invention is not particularly limited, and examples thereof include a method of sequentially performing a step of applying the above-described liquid crystal composition (hereinafter, also referred to as "composition for forming a light absorption anisotropic layer") to form a coating film (hereinafter, also referred to as "coating film forming step") and a step of aligning the liquid crystal compound and the dichroic substance (hereinafter, also collectively referred to as "liquid crystal component") contained in the coating film (hereinafter, also referred to as "aligning step").

Coating Film Forming Step

The coating film forming step is a step of applying a composition for forming a light absorption anisotropic layer to form a coating film.

The composition for forming a light absorption anisotropic layer can be easily applied by using the composition for forming a light absorption anisotropic layer which contains the above-described solvent or using a liquid-like material such as a melt obtained by heating the composition for forming a light absorption anisotropic layer.

Examples of the method of applying the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

Aligning Step

The aligning step is a step of aligning the liquid crystal component contained in the coating film. In this manner, a light absorption anisotropic layer is obtained.

The aligning step may include a drying treatment. Components such as a solvent can be removed from the coating film by performing the drying treatment. The drying treatment may be performed according to a method of allowing the coating film to stand at room temperature for a predetermined time (for example, natural drying) or a method of heating the coating film and/or blowing air to the coating film.

Here, the liquid crystal component contained in the composition for forming a light absorption anisotropic layer may be aligned by the coating film forming step or the drying treatment described above. For example, in an aspect in which the composition for forming a light absorption anisotropic layer is prepared as a coating solution containing a solvent, a coating film having light absorption anisotropy (that is, a light absorption anisotropic film) is obtained by drying the coating film and removing the solvent from the coating film.

In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability or the like. It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the light absorption anisotropic layer.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal component contained in the coating film can be fixed. The cooling means is not particularly limited and can be performed according to a known method.

The light absorption anisotropic layer can be obtained by performing the above-described steps.

In the present aspect, examples of the method of aligning the liquid crystal components contained in the coating films include a drying treatment and a heat treatment, but the method is not limited thereto, and the liquid crystal components can be aligned by a known alignment treatment.

Other Steps

The method of forming the light absorption anisotropic layer may include a step of curing the light absorption anisotropic layer after the aligning step (hereinafter, also referred to as a "curing step").

The curing step is performed by heating the light absorption anisotropic layer and/or irradiating the layer with light (exposing the layer to light), for example, in a case where the light absorption anisotropic layer contains a crosslinkable group (polymerizable group). Between these, it is preferable that the curing step is performed by irradiating the layer with light.

Various light sources such as infrared rays, visible light, and ultraviolet rays can be used as the light source for curing, but ultraviolet rays are preferable. In addition, ultraviolet rays may be applied while the layer is heated during curing, or ultraviolet rays may be applied through a filter that transmits only a specific wavelength.

In a case where the exposure is performed while the layer is heated, the heating temperature during the exposure depends on the transition temperature of the liquid crystal components contained in the liquid crystal film to a liquid crystal phase, but is preferably in a range of 25° to 140° C.

Further, the exposure may be performed under a nitrogen atmosphere. In a case where the curing of the liquid crystal film proceeds by radical polymerization, from the viewpoint of reducing inhibition of polymerization by oxygen, it is preferable that exposure is performed in a nitrogen atmosphere.

The film thickness of the optically anisotropic layer is preferably in a range of 0.1 to 5.0 µm and more preferably in a range of 0.3 to 1.5 µm. Although it depends on the concentration of the liquid crystal compound in the liquid crystal composition, an optically anisotropic layer having an excellent absorbance is obtained in a case where the film thickness of the optically anisotropic layer is 0.1 µm or greater, and an optically anisotropic layer having an excellent transmittance is obtained in a case where the film thickness thereof is 5.0 µm or less.

Laminate

The laminate according to the embodiment of the present invention includes a base material, an alignment film provided on the base material, and the light absorption anisotropic layer according to the embodiment of the present invention, which is provided on the alignment film.

Further, the laminate according to the embodiment of the present invention may include a λ/4 plate on the light absorption anisotropic layer or may include a barrier layer on the light absorption anisotropic layer.

Further, the laminate according to the embodiment of the present invention may include both a λ/4 plate and a barrier layer, and in this case, it is preferable that the laminate includes a barrier layer between the light absorption anisotropic layer and the λ/4 plate.

Hereinafter, each layer constituting the laminate according to the embodiment of the present invention will be described.

Base Material

The base material can be selected depending on the applications of the light absorption anisotropic layer, and examples thereof include glass and a polymer film. The light transmittance of the base material is preferably 80% or greater.

In a case where a polymer film is used as the base material, it is preferable to use an optically isotropic polymer film. As specific examples and preferred embodiments of the polymer, the description in paragraph [0013] of JP2002-22942A can be applied. Further, even in a case of a polymer easily exhibiting the birefringence such as polycarbonate and polysulfone which has been known in the related art, a polymer with the exhibiting property which has been decreased by modifying the molecules described in WO2000/26705A can be used.

Alignment Film

The alignment film may be any layer as long as the liquid crystal compound contained in the liquid crystal composition according to the embodiment of the present invention can be in a desired alignment state on the alignment film.

An alignment film can be provided by means such as a rubbing treatment performed on a film surface of an organic compound (preferably a polymer), oblique vapor deposition of an inorganic compound, formation of a layer having microgrooves, or accumulation of an organic compound (such as ω-tricosanoic acid, dioctadecylmethylammonium chloride, or methyl stearylate) according to a Langmuir-Blodgett method (LB film). Further, an alignment film in which an alignment function is generated by application of an electric field, application of a magnetic field, or irradiation with light is also known. Among these, in the present invention, an alignment film formed by performing a rubbing treatment is preferable from the viewpoint of easily controlling the pretilt angle of the alignment film, and a photo-alignment film formed by irradiation with light is also preferable from the viewpoint of the uniformity of alignment.

Further, the alignment film may function as the barrier layer described below.

Rubbing Treatment Alignment Film

A polymer material used for the alignment film formed by performing a rubbing treatment is described in multiple documents, and a plurality of commercially available products can be used. In the present invention, polyvinyl alcohol or polyimide and derivatives thereof are preferably used. The alignment film can refer to the description on page 43, line 24 to page 49, line 8 of WO2001/88574A1. The thickness of the alignment film is preferably in a range of 0.01 to 10 μm and more preferably in a range of 0.01 to 1 μm.

Photo-Alignment Film

A photo-alignment material used for an alignment film formed by irradiation with light is described in a plurality of documents. In the present invention, preferred examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having a photo-alignment unit described in JP2002-265541A and JP2002-317013A, photocrosslinkable silane derivatives described in JP4205195B and JP4205198B, and photocrosslinkable polyimides, polyamides, or esters described in JP2003-520878A, JP2004-529220A, and JP4162850B. Among these, azo compounds, photocrosslinkable polyimides, polyamides, or esters are more preferable.

The photo-alignment film formed of the above-described material is irradiated with linearly polarized light or non-polarized light to produce a photo-alignment film.

In the present specification, the "irradiation with linearly polarized light" and the "irradiation with non-polarized light" are operations for causing a photoreaction in the photo-alignment material. The wavelength of the light to be used varies depending on the photo-alignment material to be used and is not particularly limited as long as the wavelength is required for the photoreaction. The peak wavelength of light to be used for irradiation with light is preferably in a range of 200 nm to 700 nm, and ultraviolet light having a peak wavelength of 400 nm or less is more preferable.

Examples of the light source used for irradiation with light include commonly used light sources, for example, lamps such as a tungsten lamp, a halogen lamp, a xenon lamp, a xenon flash lamp, a mercury lamp, a mercury xenon lamp, and a carbon arc lamp, various lasers [such as a semiconductor laser, a helium neon laser, an argon ion laser, a helium cadmium laser, and a yttrium aluminum garnet (YAG) laser], a light emitting diode, and a cathode ray tube.

As means for obtaining linearly polarized light, a method of using a polarizing plate (for example, an iodine polarizing plate, a dichroic coloring agent polarizing plate, or a wire grid polarizing plate), a method of using a prism-based element (for example, a Glan-Thompson prism) or a reflective type polarizer for which a Brewster's angle is used, or a method of using light emitted from a laser light source having polarized light can be employed. In addition, only light having a required wavelength may be selectively applied using a filter, a wavelength conversion element, or the like.

In a case where light to be applied is linearly polarized light, a method of applying light vertically or obliquely to the upper surface with respect to the alignment film or the surface of the alignment film from the rear surface is employed. The incidence angle of light varies depending on the photo-alignment material, but is preferably in a range of 0 to 90° (vertical) and preferably in a range of 40 to 90°.

In a case where light to be applied is non-polarized light, the alignment film is irradiated with non-polarized light obliquely. The incidence angle is preferably in a range of 10° to 80°, more preferably in a range of 20° to 60°, and still more preferably in a range of 30° to 50°.

The irradiation time is preferably in a range of 1 minute to 60 minutes and more preferably in a range of 1 minute to 10 minutes.

In a case where patterning is required, a method of performing irradiation with light using a photomask as many times as necessary for pattern preparation or a method of writing a pattern by laser light scanning can be employed.

Light Absorption Anisotropic Layer

The light absorption anisotropic layer is as described above, and thus the description thereof will not be repeated.

λ/4 Plate

Here, "λ/4 plate" is a plate having a λ/4 function, specifically, a plate having a function of converting linearly polarized light having a specific wavelength into circularly polarized light (or converting circularly polarized light into linearly polarized light).

For example, specific examples of an aspect in which a λ/4 plate has a single-layer structure include a stretched polymer film and a phase difference film in which a light absorption anisotropic layer having a λ/4 function is provided on a support. Further, specific examples of an aspect in which a λ/4 plate has a multilayer structure include a broadband λ/4 plate obtained by laminating a λ/4 plate and a λ/2 plate.

The λ/4 plate and the light absorption anisotropic layer may be provided by coming into contact with each other, or another layer may be provided between the λ/4 plate and the light absorption anisotropic layer. Examples of such a layer include a pressure sensitive adhesive layer or an adhesive layer for ensuring the adhesiveness, and a barrier layer.

Barrier Layer

In a case where the laminate according to the embodiment of the present invention includes a barrier layer, it is preferable that the barrier layer is provided between the light absorption anisotropic layer and the λ/4 plate. Further, in a case where the laminate includes a layer other than the barrier layer (for example, a pressure sensitive adhesive layer or an adhesive layer) between the light absorption anisotropic layer and the λ/4 plate, the barrier layer can be provided, for example, between the light absorption anisotropic layer and the layer other than the light absorption anisotropic layer.

The barrier layer is also referred to as a gas blocking layer (oxygen blocking layer) and has a function of protecting the light absorption anisotropic layer from gas such as oxygen in the atmosphere, the moisture, or the compound contained in an adjacent layer.

In regard to the barrier layer, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A can be referred to.

Applications

The laminate according to the embodiment of the present invention can be used as a polarizer (polarizing plate), for example, as a linearly polarizing plate or a circularly polarizing plate.

In a case where the laminate according to the embodiment of the present invention does not include the λ/4 plate, the laminate can be used as a linearly polarizing plate.

Meanwhile, in a case where the laminate according to the embodiment of the present invention includes the λ/4 plate, the laminate can be used as a circularly polarizing plate.

Image Display Device

An image display device according to the embodiment of the present invention includes the above-described light absorption anisotropic layer according to the embodiment of the present invention or the above-described laminate according to the embodiment of the present invention.

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable, and a liquid crystal cell is more preferable. That is, in the image display device according to the embodiment of the present invention, a liquid crystal display device formed of a liquid crystal cell as a display element or an organic EL display device formed of an organic EL display panel as a display element is preferable, and a liquid crystal display device is more preferable.

Liquid Crystal Display Device

As a liquid crystal display device which is an example of the image display device according to the embodiment of the present invention, an aspect of a liquid crystal display device including the above-described light absorption anisotropic layer and a liquid crystal cell is preferably exemplified. A liquid crystal display device including the above-described laminate (here, the laminate does not include a λ/4 plate) and a liquid crystal cell is more suitable.

In the present invention, between the light absorption anisotropic layers (laminate) provided on both sides of the liquid crystal cell, it is preferable that the light absorption anisotropic layer (laminate) according to the embodiment of the present invention is used as a front-side polarizing element and more preferable that the light absorption anisotropic layer (laminate) according to the embodiment of the present invention is used as a front-side polarizing element and a rear-side polarizing element.

Hereinafter, the liquid crystal cell constituting the liquid crystal display device will be described in detail.

Liquid Crystal Cell

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal molecules are substantially horizontally aligned at the time of no voltage application and further twistedly aligned at 60° to 120°. The liquid crystal cell in a TN mode is most likely used as a color thin film transistor (TFT) liquid crystal display device and is described in multiple documents.

In the liquid crystal cell in a VA mode, rod-like liquid crystal molecules are substantially vertically aligned at the time of no voltage application. The concept of the liquid crystal cell in a VA mode includes (1) a liquid crystal cell in a VA mode in a narrow sense where rod-like liquid crystal molecules are aligned substantially vertically at the time of no voltage application and substantially horizontally at the time of voltage application (described in JP1990-176625A (JP-H2-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application (described in proceedings of Japanese Liquid Crystal Conference, p. 58 to 59 (1998)), and (4) a liquid crystal cell in a SURVIVAL mode (presented at LCD International 98). Further, the liquid crystal cell may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

Organic EL Display Device

As an organic EL display device which is an example of the image display device according to the embodiment of the present invention, an aspect of an image display device including a light absorption anisotropic layer, a λ/4 plate, and an organic EL display panel in this order from the viewing side is suitably exemplified.

An aspect of an image display device including the above-described laminate including a λ/4 plate and an organic EL display panel in this order from the viewing side is more suitably exemplified. In this case, the laminate is formed such that a base material, an alignment film provided as necessary, a light absorption anisotropic layer, a barrier layer provided as necessary, and a λ/4 plate are disposed in this order from the viewing side.

Further, the organic EL display panel is a display panel formed using an organic EL element having an organic light-emitting layer (organic electroluminescence layer) interposed between electrodes (between a cathode and an anode). The configuration of the organic EL display panel is not particularly limited, and a known configuration is employed.

EXAMPLES

Hereinafter, the present invention will be described in more detail with reference to examples. Materials, used amounts, ratios, treatment contents, treatment procedures, and the like described in the following examples can be appropriately changed without departing from the spirit of the present invention. Therefore, the scope of the present invention should not be limitatively interpreted by the following examples.

Example 1

Preparation of Alignment Film

A TAC base material (TG40, manufactured by Fujifilm Corporation) subjected to a saponification treatment and having a thickness of 40 μm was coated with an alignment film coating solution 1 having the following composition using a #17 wire bar.

Thereafter, the base material was dried with warm air at 110° C. for 2 minutes, thereby obtaining a polyvinyl alcohol (PVA) alignment film on the TAC base material.

Further, modified polyvinyl alcohol was added to the alignment film coating solution such that the concentration of solid contents was set to 4% by mass.

| Composition of alignment film coating solution 1 | |
|---|---|
| Modified vinyl alcohol (PVA-1 shown below) | 2.00 parts by mass |
| Water | 74.08 parts by mass |
| Methanol | 23.86 parts by mass |
| Photopolymerization initiator IRGACURE 2959 (manufactured by BASF SE) | 0.06 parts by mass |

Modified Polyvinyl Alcohol

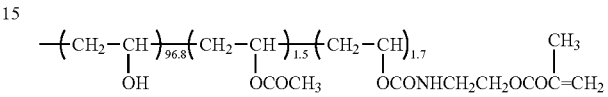

Preparation of Light Absorption Anisotropic Layer

The obtained alignment film was subjected to a rubbing treatment (roller rotation speed: 1,000 rotations/spacer, thickness of 1.8 mm, stage speed of 1.8 m/min) once and coated with the following composition 1 for forming a light absorption anisotropic layer using a #7 wire bar, thereby forming a coating film 1.

Next, the coating film 1 was heated at 140° C. for 30 seconds, and the coating film 1 was cooled to 60° C.

Thereafter, the coating film 1 was irradiated under an irradiation condition of an illuminance of 28 mW/cm² for 60 seconds using a high-pressure mercury lamp at 60° C., thereby preparing a light absorption anisotropic layer 1 on the alignment film.

| Composition of composition 1 for forming light absorption anisotropic layer | |
|---|---|
| Liquid crystal compound A1 shown below | 11.994 parts by mass |
| Compound B1 shown below | 0.121 parts by mass |
| Dichroic substance Y1 shown below | 0.337 parts by mass |
| Dichroic substance M1 shown below | 0.337 parts by mass |
| Dichroic substance C1 shown below | 0.337 parts by mass |
| Interface improver F1 shown below | 0.067 parts by mass |
| Polymerization initiator I1 (IRGACURE 369, manufactured by BASF SE) | 0.808 parts by mass |
| Tetrahydrofuran | 43.000 parts by mass |
| Cyclopentanone | 43.000 parts by mass |

Examples 2 to 9

Each of light absorption anisotropic layers 2 to 9 was prepared in the same manner as in Example 1 except that the compositions 2 to 9 for forming a light absorption anisotropic layer which were obtained by changing the composition of the composition 1 for forming a light absorption anisotropic layer to the composition listed in Table 1 were used.

Comparative Examples 1 to 3

Each of light absorption anisotropic layers 1C to 3C was prepared in the same manner as in Example 1 except that the compositions 1C to 3C for forming a light absorption anisotropic layer which were obtained by changing the composition of the composition 1 for forming a light absorption anisotropic layer to the composition listed in Table 1 were used.

Evaluation

Surface State

Each light absorption anisotropic layer in the examples and the comparative examples was set on a sample table in a state in which a linear polarizer was inserted on a light source side of an optical microscope (product name, "ECLIPSE E600 POL", manufactured by Nikon Corporation). The set light absorption anisotropic layer was observed with a microscope having an objective lens with a magnification of 10 times. Optionally selected 10 sites of each light absorption anisotropic layer were observed, and the surface state of the light absorption anisotropic layer was evaluated according to the following evaluation standards. The results are listed in Table 1.

Evaluation Standards

A: Defects were observed in 3 or less of the 10 observed sites.
B: Defects were observed in 4 to 8 of the 10 observed sites.
C: Defects were observed in 9 or more of the 10 observations.

Alignment Degree

Each light absorption anisotropic layer in the examples and the comparative examples was set on a sample table in a state in which a linear polarizer was inserted on a light source side of an optical microscope (product name, "ECLIPSE E600 POL", manufactured by Nikon Corporation). The absorbance of each light absorption anisotropic layer in a wavelength range of 380 to 780 nm was measured at a pitch of 1 nm using a multichannel spectroscope (product name, "QE65000", manufactured by Ocean Optics, Inc.) at a pitch of 1 nm, the alignment degree of each light absorption anisotropic layer at 400 to 700 nm was calculated by the following equation, and the alignment degree of the light absorption anisotropic layer was evaluated according to the following evaluation standards.

The results are listed in Table 1.

Alignment degree: $S=((Az0/Ay0)-1)/((Az0/Ay0)+2)$ $Az0$: Absorbance of coloring agent film with respect to polarized light in absorption axis direction
$Ay0$: Absorbance of coloring agent film with respect to polarized light in polarization axis direction In the equation described above, "$Az0$" represents the absorbance of the polarizer with respect to polarized light in the absorption axis direction, and "$Ay0$" represents the absorbance of the polarizer with respect to polarized light in the polarization axis direction.

Evaluation Standards

A: The alignment degree was 0.89 or greater
B: The alignment degree was 0.83 or greater and less than 0.89
C: The alignment degree was less than 0.83

TABLE 1

| | Liquid crystal composition | | | | Mass ratio compound B/liquid crystal compound A | Dichroic substance | | Dichroic substance | | Dichroic substance | | Dichroic substance | | Interface improver | | Polymerization initiator | | Tetra-hydrofuran | Cyclo-pentanone | Evaluation | |
|---|---|---|---|---|---|---|---|---|---|---|---|---|---|---|---|---|---|---|---|---|---|
| | Liquid crystal compound A | | Compound B | | | | | | | | | | | | | | | | | Surface state | Alignment degree |
| | Type | Parts by mass | Type | Parts by mass | | Type | Parts by mass | Type | Parts by mass | Type | Parts by mass | Type | Parts by mass | Type | Parts by mass | Type | Parts by mass | Parts by mass | Parts by mass | | |
| Example 1 | A1 | 11.994 | B1 | 0.121 | 0.010 | Y1 | 0.337 | M1 | 0.337 | C1 | 0.337 | | | F1 | 0.067 | II | 0.808 | 43.000 | 43.000 | A | A |
| Example 2 | A2 | 11.994 | B1 | 0.121 | 0.010 | Y1 | 0.337 | M1 | 0.337 | C1 | 0.337 | | | F1 | 0.067 | II | 0.808 | 43.000 | 43.000 | B | A |
| Example 3 | A2 | 11.994 | B2 | 0.121 | 0.010 | Y1 | 0.337 | M1 | 0.337 | C1 | 0.337 | | | F1 | 0.067 | II | 0.808 | 43.000 | 43.000 | A | A |
| Example 4 | A2 | 11.752 | B2 | 0.363 | 0.031 | Y1 | 0.337 | M3 | 0.337 | C1 | 0.337 | | | F1 | 0.067 | II | 0.808 | 43.000 | 43.000 | A | A |
| Example 5 | A2 | 15.014 | B2 | 0.045 | 0.003 | Y2 | 0.402 | M2 | 0.335 | C2 | 0.368 | | | F1 | 0.084 | II | 0.753 | 41.500 | 41.500 | A | A |
| Example 6 | A2 | 12.800 | B2 | 2.259 | 0.176 | Y2 | 0.402 | M2 | 0.335 | C2 | 0.368 | | | F1 | 0.084 | II | 0.753 | 41.500 | 41.500 | B | B |
| Example 7 | A3 | 16.565 | B3 | 10.167 | 0.010 | Y2 | 0.409 | M4 | 0.409 | C2 | 0.409 | | | F1 | 0.112 | II | 0.930 | 40.500 | 40.500 | A | A |
| Example 8 | A3 | 16.565 | B4 | 0.167 | 0.010 | Y2 | 0.409 | M2 | 0.409 | C2 | 0.409 | | | F1 | 0.112 | II | 0.930 | 40.500 | 40.500 | B | A |
| Example 9 | A3 | 16.565 | B3 | 0.167 | 0.010 | Y2 | 0.409 | M2 | 0.409 | C2 | 0.205 | C3 | 0.205 | F1 | 0.112 | II | 0.930 | 40.500 | 40.500 | A | A |
| Comparative Example 1 | A1 | 11.752 | B5 | 10.363 | 0.031 | Y1 | 0.337 | M1 | 0.337 | C1 | 0.337 | | | F1 | 0.067 | II | 0.808 | 43.000 | 43.000 | C | C |
| Comparative Example 2 | A2 | 14.607 | B5 | 0.452 | 0.031 | Y2 | 0.402 | M2 | 0.335 | C2 | 0.368 | | | F1 | 0.084 | II | 0.753 | 41.500 | 41.500 | C | C |
| Comparative Example 3 | A3 | 16.230 | B6 | 0.502 | 0.031 | Y2 | 0.409 | M2 | 0.409 | C2 | 0.409 | | | F1 | 0.112 | II | 0.930 | 40.500 | 40.500 | C | C |

The components denoted by symbols in Table 1 are shown below.
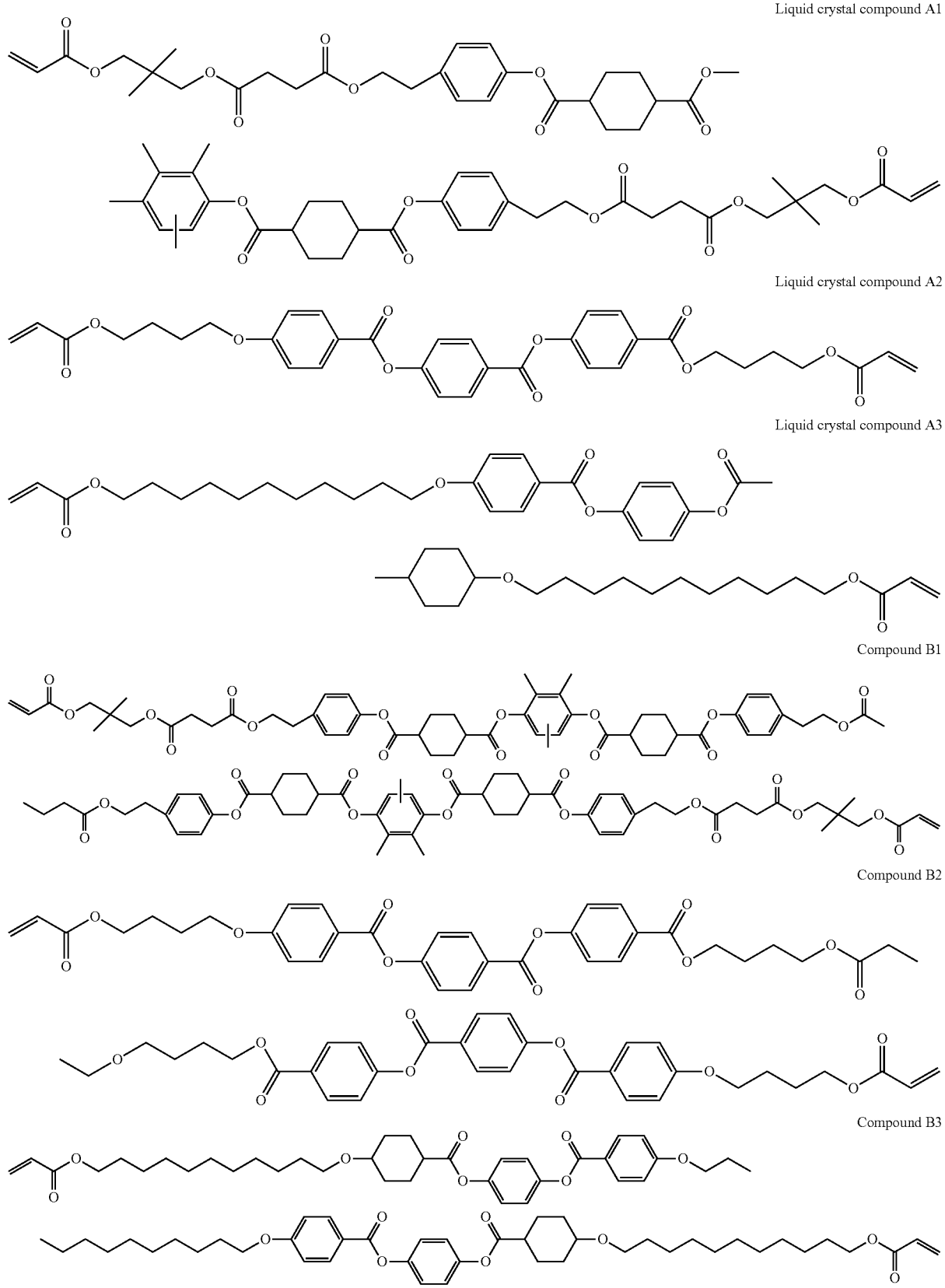

Compound B4
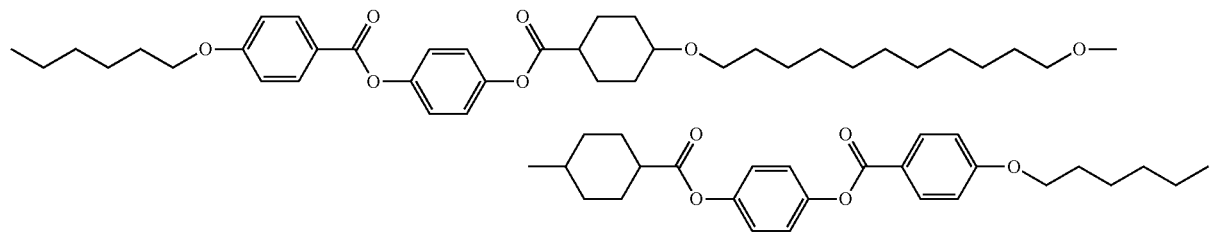
Compound B5
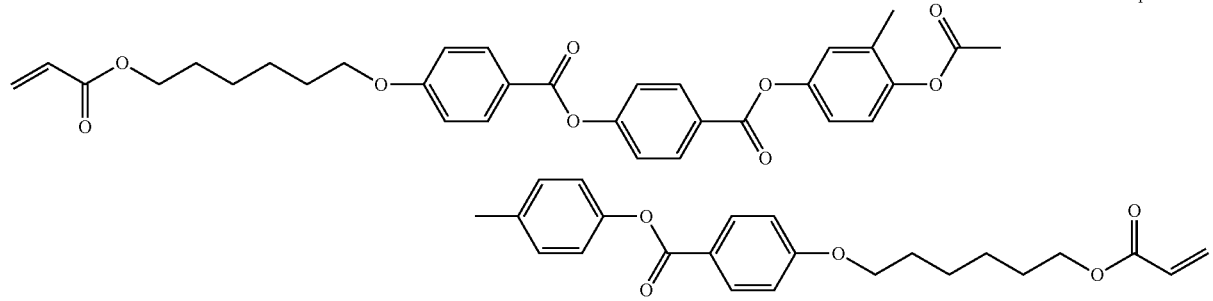
Compound B6
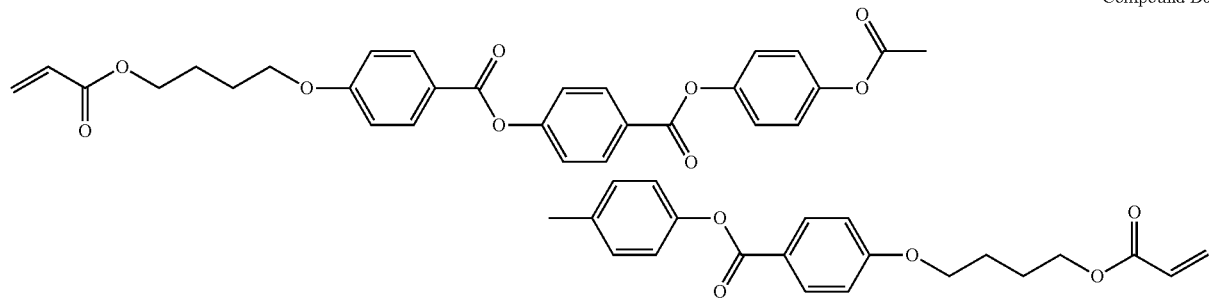
Dichroic substance Y1
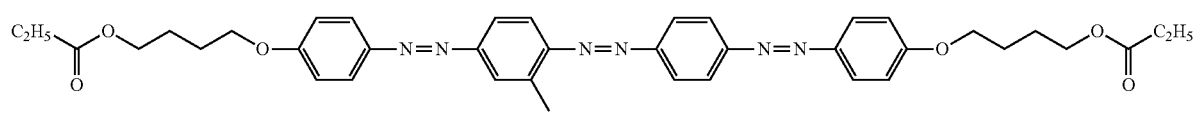
Dichroic substance Y2
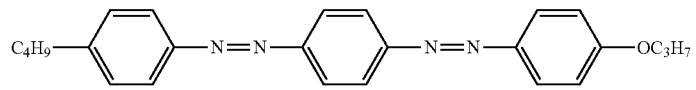
Dichroic substance M1
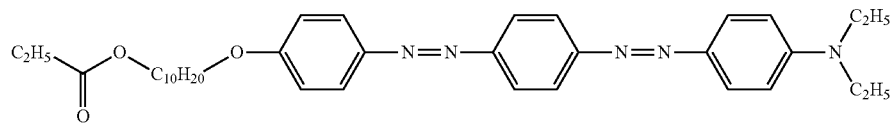
Dichroic substance M2
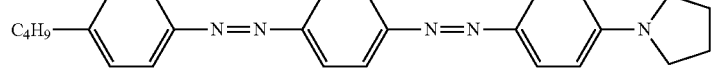
Dichroic substance M3
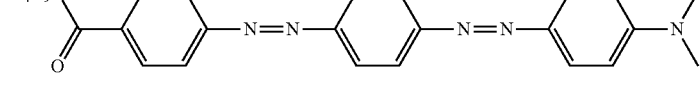
Dichroic substance M4
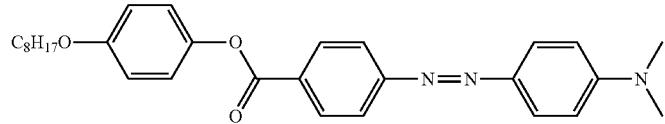

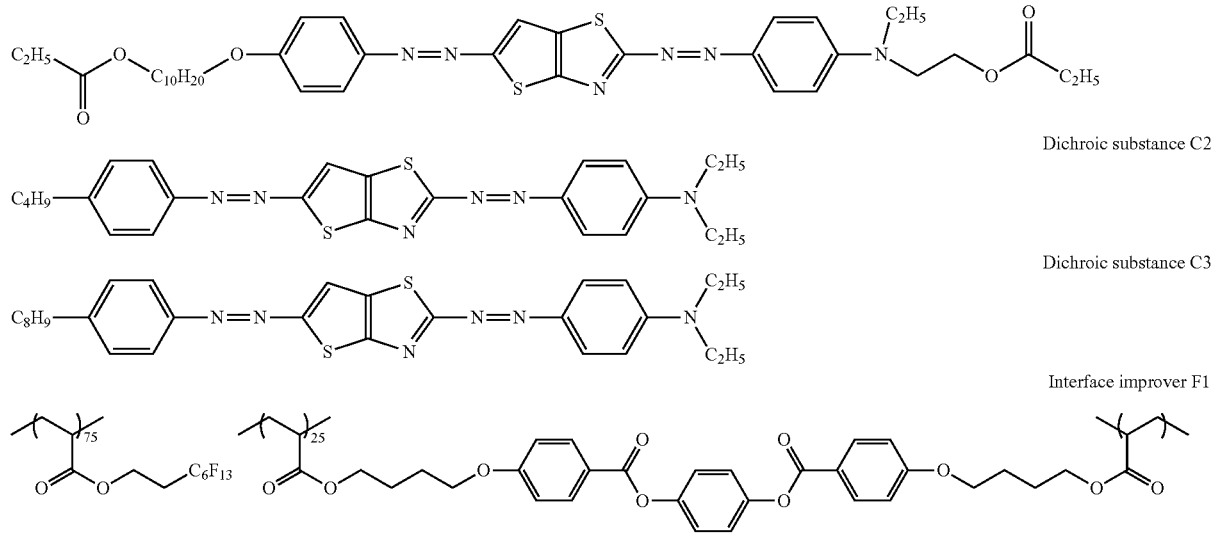

As shown in the results listed in Table 1, it was found that in a case where a compound which did not have the structure of SP3 in Formula (II) was used as the compound B, both the surface state and the alignment degree of the light absorption anisotropic layer were degraded (Comparative Examples 1 to 3).

On the contrary, it was found that in a case where the liquid crystal compound A represented by Formula (I) and the compound B represented by Formula (II) were blended, both the surface state and the alignment degree of the light absorption anisotropic layer were enhanced (Examples 1 to 9).

In particular, based on the comparison of Examples 1 to 3, it was found that in a case where the structure represented by -(Ma-La)na- in Formula (I) and the structures represented by -(Mb-Lb)nb- and -(Mc-Lc)nc- in Formula (II) were the same as each other, the surface state of the light absorption anisotropic layer was enhanced.

Further, based on the comparison of Examples 4 to 6, it was found that in a case where the ratio (mass ratio) of the mass of the compound B to the mass of the liquid crystal compound A was in a range of 0.001 to 0.04, the surface state of the light absorption anisotropic layer to be formed was enhanced, and the alignment degree thereof was further increased.

Further, based on the comparison between Examples 8 and 9, it was found that in a case where both Q1 and Q2 in Formula (II) represent a polymerizable group, the surface state of the light absorption anisotropic layer to be formed was further enhanced.

What is claimed is:

1. A liquid crystal composition comprising:
a liquid crystal compound A represented by Formula (I);
a compound B represented by Formula (II); and
a dichroic substance,
wherein a ratio of a mass of the compound B to a mass of the liquid crystal compound A is in a range of 0.001 to 0.04, Q1-V1-SP1-X1-(Ma-La)na-X2-SP2-V2-Q2     (I)

Q1-V1-SP1-X1-(Mb-Lb)nb-SP3-(Mc-Lc)nc-X2-SP2-V2-Q2     (II)

in Formulae (I) and (II),
Q1 and Q2 each independently represent a polymerizable group,
V1, V2, X1, and X2 each independently represent a single bond or a divalent linking group,
SP1 and SP2 each independently represent a divalent spacer group,
SP3 represents a divalent linear spacer group having three or more atoms constituting a main chain of a bonding site and two or more and 25 or less carbon atoms,
na, nb, and nc each independently represent an integer of 2 to 10,
Ma, Mb, and Mc each independently represent an aromatic ring, an aliphatic ring, or a heterocyclic ring which may have a substituent, where a plurality of Ma's may be the same as or different from each other, a plurality of Mb's may be the same as or different from each other, and a plurality of Mc's may be the same as or different from each other,
La represents a single bond or a divalent linking group, where a plurality of La's may be the same as or different from each other, and in a case where La present between Ma and Ma represents a divalent linking group, a divalent linking group consisting of a divalent linear spacer group having three or more atoms constituting a main chain of a bonding site and two or more carbon atoms is excluded, and
Lb and Lc each independently represent a single bond or a divalent linking group, where a plurality of Lb's may be the same as or different from each other, and a plurality of Lc's may be the same as or different from each other.

2. The liquid crystal composition according to claim 1, wherein at least one of the liquid crystal compound A or the compound B is a compound exhibiting a liquid crystal state of a smectic phase.

3. The liquid crystal composition according to claim 1, wherein a structure represented by -(Ma-La)na- in Formula (I) and a structure represented by -(Mb-Lb)nb- in Formula (II) are the same structure.

4. The liquid crystal composition according to claim 2, wherein a structure represented by -(Ma-La)na- in Formula (I) and a structure represented by -(Mb-Lb)nb- in Formula (II) are the same structure.

5. The liquid crystal composition according to claim 1, wherein a structure represented by -(Ma-La)na- in Formula (I) and a structure represented by -(Mc-Lc)nc- in Formula (II) are the same structure.

6. The liquid crystal composition according to claim 2, wherein a structure represented by -(Ma-La)na- in Formula (I) and a structure represented by -(Mc-Lc)nc- in Formula (II) are the same structure.

7. The liquid crystal composition according to claim 3, wherein a structure represented by -(Ma-La)na- in Formula (I) and a structure represented by -(Mc-Lc)nc- in Formula (II) are the same structure.

8. The liquid crystal composition according to claim 4, wherein a structure represented by -(Ma-La)na- in Formula (I) and a structure represented by -(Mc-Lc)nc- in Formula (II) are the same structure.

9. A light absorption anisotropic layer which is formed of the liquid crystal composition according to claim 1.

10. A light absorption anisotropic layer which is formed of the liquid crystal composition according to claim 2.

11. A laminate comprising:
    a base material;
    an alignment film provided on the base material; and
    the light absorption anisotropic layer according to claim 9 which is provided on the alignment film.

12. An image display device comprising:
    the light absorption anisotropic layer according to claim 9.

* * * * *